(12) United States Patent
Kim et al.

(10) Patent No.: US 11,647,525 B2
(45) Date of Patent: May 9, 2023

(54) METHOD AND APPARATUS FOR ENHANCING COVERAGE FOR PDCCH IN WIRELESS COMMUNICATION SYSTEM

(71) Applicant: Samsung Electronics Co., Ltd., Suwon-si (KR)

(72) Inventors: Taehyoung Kim, Suwon-si (KR); Jinkyu Kang, Suwon-si (KR); Youngbum Kim, Suwon-si (KR); Hoondong Noh, Suwon-si (KR); Seunghoon Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 30 days.

(21) Appl. No.: 16/914,128

(22) Filed: Jun. 26, 2020

(65) Prior Publication Data
US 2020/0413412 A1    Dec. 31, 2020

(30) Foreign Application Priority Data

Jun. 28, 2019 (KR) .................. 10-2019-0078303

(51) Int. Cl.
*H04W 72/53* (2023.01)
*H04W 72/044* (2023.01)
(Continued)

(52) U.S. Cl.
CPC ........... *H04W 72/53* (2023.01); *H04W 24/08* (2013.01); *H04W 72/046* (2013.01); *H04W 72/23* (2023.01)

(58) Field of Classification Search
CPC . H04W 24/08; H04W 72/042; H04W 72/046; H04W 72/0493
See application file for complete search history.

(56) References Cited

U.S. PATENT DOCUMENTS 10,057,897 B2    8/2018  You et al.
11,050,478 B2 *  6/2021  Guo ...................... H04W 76/11
(Continued)

FOREIGN PATENT DOCUMENTS

AU  2019222502 A1 *  7/2020  ........... H04B 17/373
AU  2018206592 B2 * 12/2020  ........... H04L 1/0045
(Continued)

OTHER PUBLICATIONS

International Search Report dated Sep. 28, 2020 in connection with International Application No. PCT/KR2020/008425, 3 pages.
(Continued)

*Primary Examiner* — Eric Nowlin

(57) ABSTRACT

The present disclosure relates to a communication method and system for converging a 5$^{th}$-Generation (5G) communication system for supporting higher data rates beyond a 4$^{th}$-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. The present disclosure discloses a method and apparatus for coverage enhancement for physical downlink control channel in a wireless communication system.

17 Claims, 18 Drawing Sheets

(51) Int. Cl.
*H04W 24/08* (2009.01)
*H04W 72/23* (2023.01)

(56) References Cited

U.S. PATENT DOCUMENTS

| | | | | |
|---|---|---|---|---|
| 11,057,166 | B2* | 7/2021 | Nam | H04L 5/0023 |
| 11,071,101 | B2* | 7/2021 | Seo | H04L 5/0048 |
| 11,102,643 | B2* | 8/2021 | Lin | H04W 74/0833 |
| 11,166,257 | B2* | 11/2021 | Rune | H04W 24/08 |
| 2017/0318620 | A1* | 11/2017 | Tseng | H04W 52/0216 |
| 2018/0192405 | A1* | 7/2018 | Gong | H04W 72/042 |
| 2018/0323909 | A1* | 11/2018 | Ying | H04L 1/0072 |
| 2019/0150124 | A1* | 5/2019 | Nogami | H04W 72/14 370/330 |
| 2019/0182807 | A1 | 6/2019 | Panteleev et al. | |
| 2019/0190582 | A1* | 6/2019 | Guo | H04L 27/2607 |
| 2019/0260524 | A1* | 8/2019 | Nam | H04L 25/0258 |
| 2019/0306700 | A1* | 10/2019 | Lin | H04W 76/11 |
| 2020/0015258 | A1* | 1/2020 | Zhou | H04W 72/042 |
| 2020/0396713 | A1* | 12/2020 | Ananda | H04W 76/28 |
| 2020/0413412 | A1* | 12/2020 | Kim | H04L 5/0053 |
| 2021/0021381 | A1* | 1/2021 | Saber | H04L 1/1896 |
| 2021/0050936 | A1* | 2/2021 | Seo | H04L 5/0053 |
| 2021/0058906 | A1* | 2/2021 | Seo | H04W 16/28 |
| 2021/0204244 | A1* | 7/2021 | Rune | H04W 68/005 |
| 2021/0306996 | A1* | 9/2021 | Matsumura | H04L 5/0048 |
| 2021/0360666 | A1* | 11/2021 | Yoshimura | H04W 24/08 |

FOREIGN PATENT DOCUMENTS

| | | | | |
|---|---|---|---|---|
| BR | 112018070709 | A2 * | 2/2019 | H04L 1/08 |
| BR | 112019014030 | A2 * | 2/2020 | H04L 1/0045 |
| BR | 112020024492 | A2 * | 3/2021 | H04W 72/0446 |
| CA | 3095641 | A1 * | 12/2018 | H04B 7/024 |
| CA | 3064313 | A1 * | 10/2019 | H04B 17/373 |
| CA | 3083316 | A1 * | 12/2020 | H04L 1/1864 |
| CN | 109155931 | A * | 1/2019 | H04L 1/0045 |
| CN | 109347611 | A * | 2/2019 | H04L 1/0045 |
| CN | 109792773 | A * | 5/2019 | H04L 1/08 |
| CN | 110474751 | A * | 11/2019 | H04L 5/0053 |
| CN | 109347611 | B * | 1/2020 | H04L 1/0045 |
| CN | 111106913 | A * | 5/2020 | H04B 17/373 |
| CN | 111106915 | A * | 5/2020 | H04B 7/088 |
| CN | 111314037 | A * | 6/2020 | H04L 1/0045 |
| CN | 111713049 | A * | 9/2020 | H04B 17/373 |
| CN | 111106913 | B * | 4/2021 | H04B 17/373 |
| CN | 112640544 | A * | 4/2021 | H04W 24/08 |
| CN | 111106915 | B * | 11/2021 | H04B 7/088 |
| CN | 111314037 | B * | 1/2022 | H04L 1/0045 |
| CN | 110324133 | B * | 2/2022 | H04L 5/0053 |
| CN | 111713049 | B * | 12/2022 | H04B 17/373 |
| EP | 3434065 | A1 * | 1/2019 | H04L 1/08 |
| EP | 3451553 | A2 * | 3/2019 | H04B 7/0617 |
| EP | 3434065 | A4 * | 6/2019 | H04L 1/08 |
| EP | 3547783 | A1 * | 10/2019 | H04L 5/0053 |
| EP | 3567967 | A1 * | 11/2019 | H04B 7/0413 |
| EP | 3609112 | A1 | 2/2020 | |
| EP | 3767859 | A1 * | 1/2021 | H04L 5/0053 |
| EP | 3556134 | B1 * | 2/2021 | H04L 1/0045 |
| EP | 3567967 | B1 * | 2/2021 | H04B 7/0413 |
| EP | 3547783 | B1 * | 5/2021 | H04L 5/0053 |
| EP | 3823336 | A1 * | 5/2021 | H04B 7/088 |
| EP | 3833091 | A1 * | 6/2021 | H04L 1/0045 |
| EP | 3641461 | B1 * | 9/2021 | H04B 7/0617 |
| EP | 3753142 | B1 * | 12/2021 | H04B 17/373 |
| ES | 2861202 | T3 * | 10/2021 | H04B 7/0413 |
| ES | 2881352 | T3 * | 11/2021 | H04L 5/0053 |
| ES | 2905205 | T3 * | 4/2022 | H04B 17/373 |
| JP | 2021019356 | A * | 2/2021 | H04L 1/1861 |
| JP | 2021514123 | A * | 6/2021 | |
| JP | WO2020012661 | A1 * | 7/2021 | H04B 7/088 |
| KR | 10-2015-0108348 | A | 9/2015 | |
| KR | 10-2018-0123417 | A | 11/2018 | |
| KR | 20190054978 | A * | 5/2019 | |
| KR | 102105511 | B1 * | 4/2020 | |
| KR | 20200090849 | A * | 7/2020 | |
| KR | 20200120628 | A * | 10/2020 | |
| KR | 20210010813 | A * | 1/2021 | H04L 1/1671 |
| TW | 201742487 | A * | 12/2017 | H04L 1/08 |
| TW | 202106061 | A * | 6/2020 | |
| TW | 202105945 | A * | 7/2020 | |
| WO | WO-2017186167 | A1 * | 11/2017 | H04L 1/08 |
| WO | WO-2018127109 | A1 * | 7/2018 | H04L 1/0045 |
| WO | WO-2018232199 | A1 * | 12/2018 | H04L 1/1812 |
| WO | WO-2019124983 | A1 * | 6/2019 | H04B 17/17 |
| WO | WO-2019160713 | A1 * | 8/2019 | H04B 17/373 |
| WO | WO-2019216640 | A1 * | 11/2019 | H04W 72/0406 |
| WO | WO-2019243457 | A1 * | 12/2019 | H04L 5/1469 |
| WO | WO-2020069135 | A2 * | 4/2020 | H04L 5/0092 |
| WO | WO-2020252412 | A1 * | 12/2020 | H04W 48/12 |
| WO | WO-2020263048 | A1 * | 12/2020 | H04L 5/0053 |

OTHER PUBLICATIONS

Huawei, et al., "Reliability/robustness enhancement with multi-TRP/panel/beam for PDCCH/PUSCH/PUCCH," R1-1900850, 3GPP TSG RAN WG1 Ad-Hoc Meeting 1901, Taipei, Jan. 21-25, 2019, 5 pages.
Mediatek Inc, "Evaluations and enhancements of NR PDCCH for URLLC," R1-1900208, 3GPP TSG RAN WG1 Meeting AH-1901, Taipei, Taiwan, Jan. 21-25, 2019, 11 pages.
ZTE, "On PDCCH enhancements for URLLC," R1-1900069, 3GPP TSG RAN WG1 Ad-Hoc Meeting 1901, Taipei, Jan. 21-25, 2019, 11 pages.

* cited by examiner

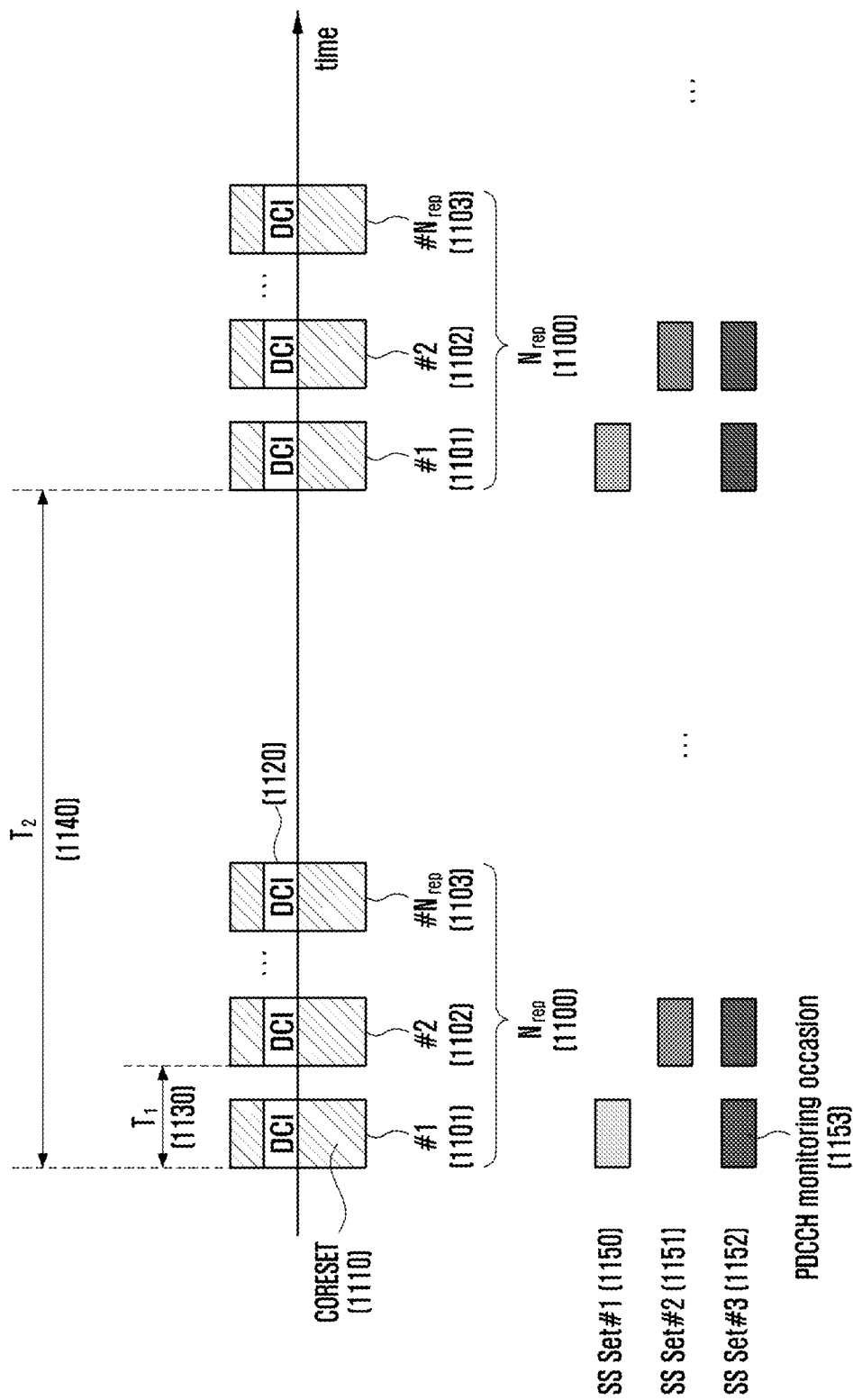

METHOD AND APPARATUS FOR ENHANCING COVERAGE FOR PDCCH IN WIRELESS COMMUNICATION SYSTEM

CROSS-REFERENCE TO RELATED APPLICATION

This application is based on and claims priority under 35 U.S.C. 119 to Korean Patent Application No. 10-2019-0078303 filed on Jun. 28, 2019 in the Korean Intellectual Property Office, the disclosure of which is herein incorporated by reference in its entirety.

BACKGROUND

1. Field

The disclosure relates to a method and an apparatus for enhancing coverage for a PDCCH in a wireless communication system.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

The above information is presented as background information only to assist with an understanding of the disclosure. No determination has been made, and no assertion is made, as to whether any of the above might be applicable as prior art with regard to the disclosure.

SUMMARY

A disclosed embodiment is to provide a method and an apparatus for effectively providing service in a mobile communication system.

The disclosure has been made to solve the problems described above, and provides a method for processing a control signal in a wireless communication system, the method including: receiving a first control signal transmitted from a base station; processing the received first control signal; and transmitting a second control signal generated based on the processing, to the base station. In addition, according to an embodiment, the disclosure provides a method of a base station, the method including: identifying a configuration relating to a downlink control channel (PDCCH), wherein the configuration relating to the PDCCH includes at least one of a configuration relating to repetitive transmission of the PDCCH or a configuration relating to multi-beam transmission of the PDCCH; and performing at least one of repetitive transmission or multi-beam transmission of the PDCCH, based on the configuration relating to the PDCCH.

In addition, according to an embodiment, the disclosure provides a method of a terminal, the method including: receiving configuration information relating to a downlink control channel (PDCCH) from a base station, wherein the configuration information includes at least one of configuration information relating to repetitive transmission of the PDCCH or configuration information relating to multi-beam transmission of the PDCCH; and performing a reception operation of the PDCCH, based on the configuration information.

In an embodiment, the configuration information relating to repetitive transmission includes at least one of: information relating to whether repetitive transmission of the PDCCH is performed; information relating to a number of repetitive transmissions of the PDCCH; information relating to a maximum value of the number of repetitive transmissions of the PDCCH; configuration information relating to a PDCCH monitoring occasion related to repetitive transmission of the PDCCH; information relating to a start time point of repetitive transmission of the PDCCH; information relating to an interval of repetitive transmission of the PDCCH; or information relating to a repetitive transmission period of the PDCCH.

In an embodiment, the repetitive transmission of the PDCCH is performed in PDCCH monitoring occasions in a DRX inactive time.

In an embodiment, the configuration information relating to multi-beam transmission includes information relating to whether multi-beam transmission for the PDCCH is performed.

A disclosed embodiment provides a method and an apparatus for effectively providing service in a mobile communication system.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 11A illustrates an example of a repetitive transmission method for a PDCCH according to an embodiment;

DETAILED DESCRIPTION

Figure 1:
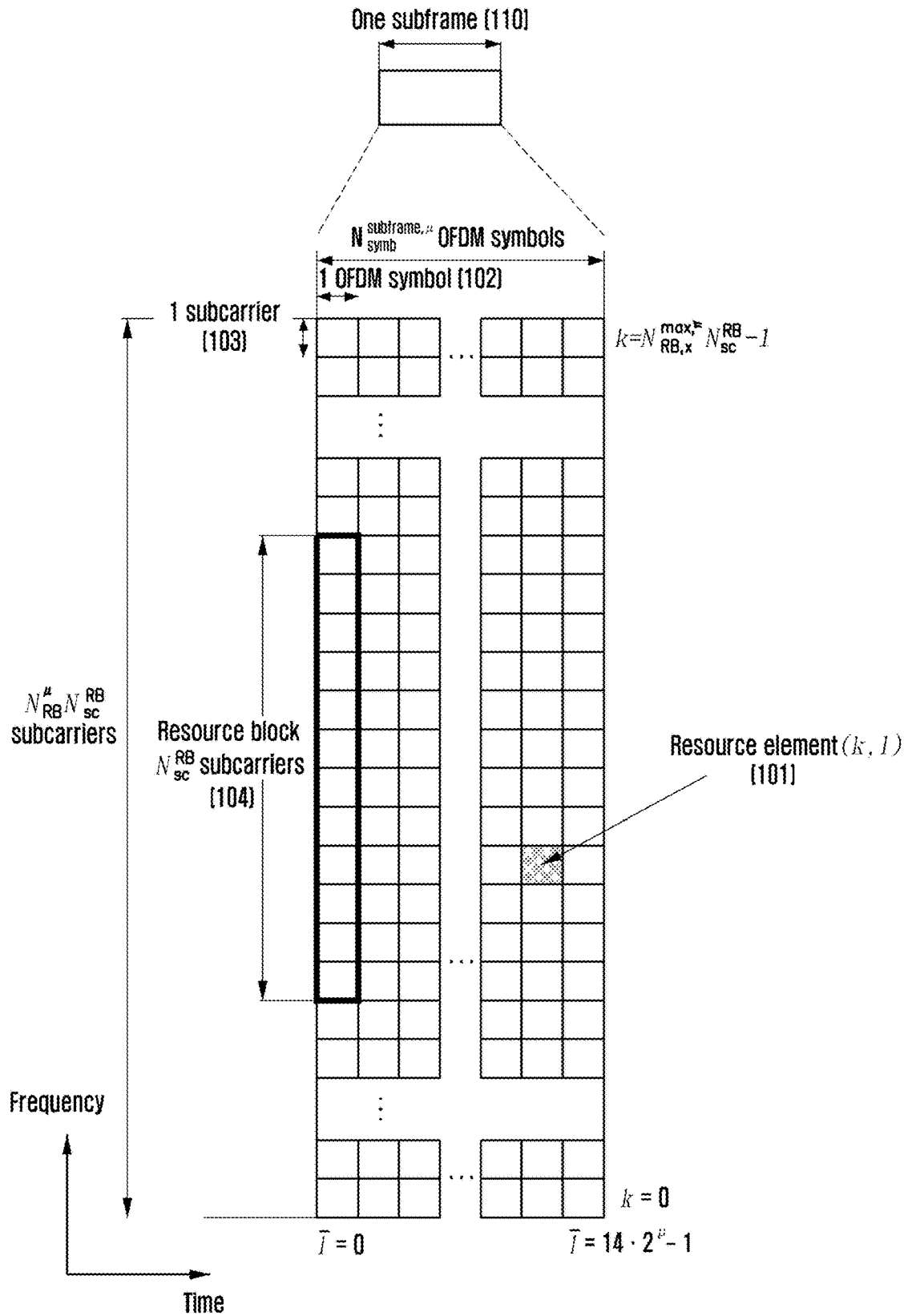
FIG. 1 illustrates a basic structure of a time-frequency domain in 5G.

FIGS. 1 through 14, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, embodiments of the disclosure will be described in detail with reference to the accompanying drawings.

In describing embodiments of the disclosure, descriptions related to technical contents well-known in the art and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements. In the following description of the disclosure, a detailed description of known functions or configurations incorporated herein will be omitted when it may make the subject matter of the disclosure rather unclear. The terms which will be described below are terms defined in consideration of the functions in the disclosure, and may be different according to users, intentions of the users, or customs. Therefore, the definitions of the terms should be made based on the contents throughout the specification.

Hereinafter, a base station is a subject configured to perform resource allocation to a terminal, and may be one of a gNode B, an eNode B, a Node B, a base station (BS), a wireless access unit, a base station controller, or a node on a network. A terminal may include a user equipment (UE), a mobile station (MS), a cellular phone, a smartphone, a computer, or a multimedia system capable of a communication function. In the disclosure, Downlink (DL) denotes a wireless transmission path of a signal transmitted by a base station to a terminal, and Uplink (UL) denotes a wireless transmission path of a signal transmitted by a terminal to a base station. In addition, hereinafter, although a LTE or LTE-A system may be described as an example, but an embodiment may be also applied to communication systems having a similar technical background or channel type. For example, the other communication systems may include a fifth generation mobile communication technology (5G, new radio, NR) developed after LTE-A, and 5G described below may be also a concept including a conventional LTE and LTE-A and other services similar thereto. In addition, the disclosure may be also applied to another communication system through partial modification without departing too far from the scope of the disclosure according to the determination of a person who skilled in the art.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more CPUs within a device or a security multimedia card. Further, the "unit" in the embodiments may include one or more processors.

A wireless communication system has developed to be a broadband wireless communication system that provides a high speed and high quality packet data service, like the communication standards, for example, high speed packet access (HSPA), long term evolution (LTE or evolved universal terrestrial radio access (E-UTRA)), LTE-advanced (LTE-A), and LTE-Pro of 3GPP, high rate packet data (HRPD), and ultra-mobile broadband (UMB) of 3GPP2, 802.16e of IEEE, and the like, beyond the voice-based service provided at the initial stage.

An LTE system, which is a representative example of the broadband wireless communication system, employs an orthogonal frequency division multiplexing (OFDM) scheme for a downlink (DL), and employs a single carrier frequency division multiple access (SC-FDMA) scheme for an uplink (UL). Uplink denotes a wireless link for transmitting data or a control signal by a terminal (user equipment (UE) or mobile station (MS)) to a base station (eNode B or base station (BS)), and downlink denotes a wireless link for transmitting data or a control signal by a base station to a terminal. In the multiple access schemes described above, time-frequency resources for carrying data or control information may be allocated and managed in a manner to prevent overlapping of the resources between users, i.e. to establish the orthogonality, so as to identify data or control information of each user.

A future communication system after LTE, that is, a 5G communication system, is required to freely apply various requirements from a user, a service provider, and the like, and thus support a service satisfying all the various requirements. Services considered for 5G communication systems may include enhanced mobile broadband (eMBB), massive machine type communication (mMTC), ultra-reliability low-latency communication (URLLC), etc.

The purpose of eMBB is to provide a data rate enhanced more than a data rate supported by the existing LTE, LTE-A, or LTE-Pro. For example, in a 5G communication system, eMBB is required to provide a peak data rate of 10 Gbps for uplink and a peak data rate of 20 Gbps for downlink in view of a single base station. Also, the 5G communication system is required to provide the peak data rates and an increased user perceived data rate of a terminal. In order to satisfy the requirements described above, a 5G communication system requires the improvement of various transmission/reception technologies including further enhanced multi input multi output (MIMO) transmission technology. In addition, while LTE uses, for the transmission of a signal, a maximum transmission bandwidth of 20 MHz in a band of 2 GHz used by the LTE, a, 5G communication system uses a frequency bandwidth greater than 20 MHz in a frequency band of 3-6 GHz or a frequency band of 6 GHz or greater to satisfy a data transfer rate required for the 5G communication system.

Meanwhile, in a 5G communication system, mMTC has been considered to support application services such as the Internet of Things (IoT). mMTC requires the support of massive terminal connection in a cell, the improvement of terminal coverage, improved battery life time, terminal cost reduction, etc. in order to efficiently provide the Internet of Things. Since the Internet of Things is mounted in various sensors and devices to provide communication functions, mMTC is required to support a large number of terminals (e.g. 1,000,000 terminals/km2) in a cell. Also, a terminal supporting mMTC may require a wider coverage compared to other services provided in a 5G communication system because the terminal is highly probable, due to the nature of mMTC, to be disposed in a radio shadow area such as the basement of a building, which a cell fails to cover. A terminal supporting mMTC is required to be inexpensive and have a very long battery life time, like 10-15 years, because it is hard to often change the battery of the terminal.

Lastly, URLLC is a cellular-based wireless communication service which is used for a particular purpose (mission-critical). For example, services used in remote control for robots or machinery, industrial automation, unmanned aerial vehicle, remote health care, emergency alert, etc. may be considered for URLLC. Therefore, communication provided by URLLC is required to provide very low latency and very high reliability. For example, a service supporting URLLC is required to satisfy a wireless connection latency time (air interface latency) smaller than 0.5 milliseconds and a packet error rate of 10-5 or smaller at the same time. Therefore, for services supporting URLLC, a 5G system may require a design for providing a transmission time interval (TTI) shorter than those of other services and allocating a wide domain of resources in a frequency band to secure the reliability of a communication link.

Three services of 5G, that is, eMBB, URLLC, and mMTC, may be multiplexed and then transmitted in a single system. In order to satisfy different requirements of the services, different transmission/reception schemes and different transmission/reception parameters may be used for the services, respectively. However, 5G is not limited to the three described services.

Hereinafter, a frame structure of a 5G system will be described in detail with reference to the drawings.

FIG. 1 illustrates a basic structure of a time-frequency domain which is a wireless resource region in which data or a control channel is transmitted, in a 5G system.

In FIG. 1, the transverse axis indicates a time domain, and the longitudinal axis indicates a frequency domain. In the time-frequency domain, a basic unit of a resource may be defined as a resource element (RE) 101, that is, one orthogonal frequency division multiplexing (OFDM) symbol 102 in a time axis and one subcarrier 103 in a frequency axis. In the frequency domain, $N^{RB}_{SC}$ number (e.g. 12) of consecutive REs may configure a single resource block (RB) 104.

Figure 2:
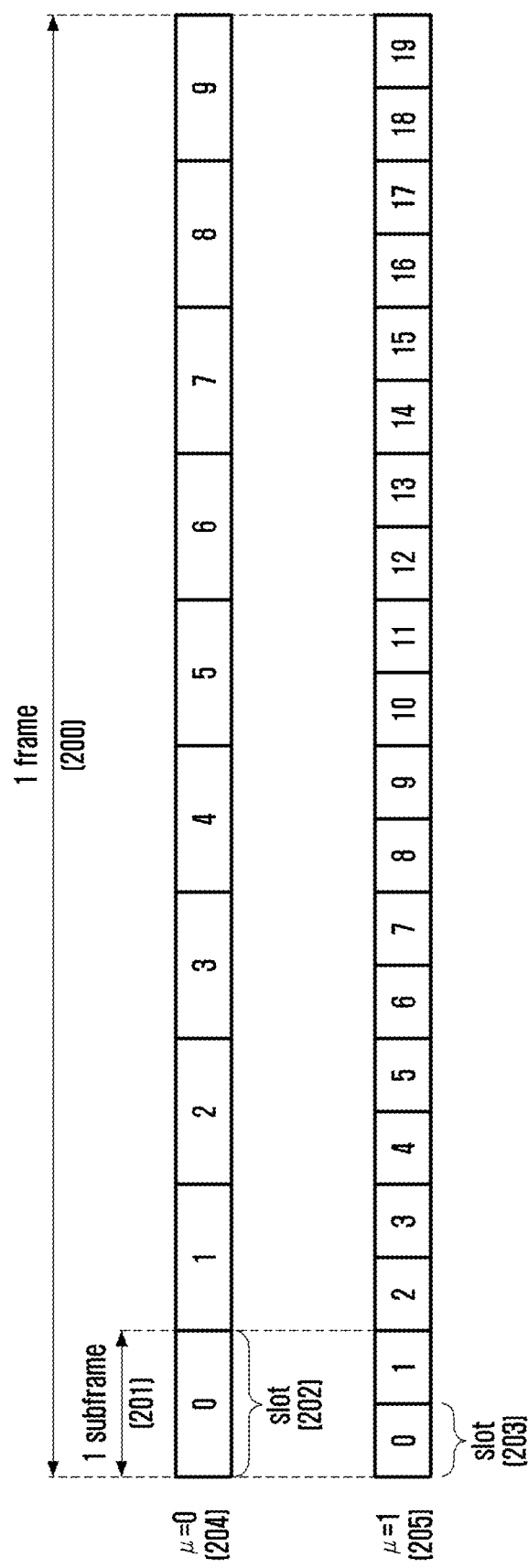
FIG. 2 illustrates a frame, subframe, and slot structure in 5G.

FIG. 2 illustrates a slot structure considered for a 5G system.

FIG. 2 illustrates an example of a structure of a frame 200, a subframe 201, and a slot 202. One frame 200 may be defined as 10 ms. One subframe 201 may be defined as 1 ms, and thus one frame 200 may be configured by a total of 10 subframes 201. One slot 202 or 203 may be defined as 14 OFDM symbols (i.e. the number ($N^{slot}_{symb}$) of symbols per one slot=14). One subframe 201 may be configured by one slot 202 or a plurality of slots 203, and the number of slots 202 or 203 per one subframe 201 may be different according to a configuration value µ 204 or 205 of subcarrier spacing. FIG. 2 illustrates an example in which a subcarrier spacing configuration value µ is 0 (the case indicated by reference numeral 204), and 1 (the case indicated by reference numeral 205). If µ is 0 (204), one subframe 201 may be configured by one slot 202, and if µ is 1 (205), one subframe 201 may be configured by two slots 203. That is, the number ($N^{subframe}_{slot}$) of slots per one subframe may be different according to a configuration value µ of a subcarrier spacing, and according thereto, the number ($N^{frame}_{slot}$) of slots per one frame may be different. $N^{subframe}_{slot}$ and $N^{frame}_{slot}$ according to each subcarrier spacing configuration µ may be defined as shown in Table 1 below.

TABLE 1

| µ | $N^{slot}_{symb}$ | $N^{frame,µ}_{slot}$ | $N^{subframe,µ}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

Next, a bandwidth part (BWP) configuration in a 5G communication system will be described in detail with reference to the drawings.

Figure 3:
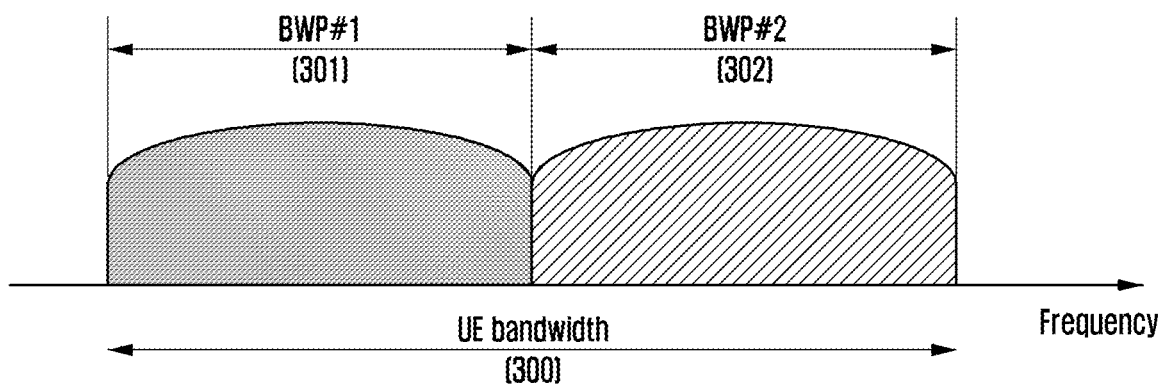
FIG. 3 illustrates an example of a bandwidth part configuration in 5G.

FIG. 3 illustrates an example of a configuration of a bandwidth part in a 5G communication system.

FIG. 3 illustrates an example in which a terminal bandwidth (UE bandwidth) 300 is configured to be divided into two bandwidth parts, that is, bandwidth part #1 (BWP #1) 301 and bandwidth part #2 (BWP #2) 302. A base station may configure one bandwidth part or a plurality of bandwidth parts for a terminal and may configure pieces of information below for each bandwidth part.

```
BWP ::=                SEQUENCE {
    bwp-Id                 BWP-Id,
    (Bandwidth part identifier)
    locationAndBandwidth   INTEGER (1..65536),
    (Location of bandwidth part)
    subcarrierSpacing      ENUMERATED {n0, n1, n2, n3, n4, n5},
    (Subcarrier spacing)
    cyclicPrefix           ENUMERATED { extended }
    (Cyclic prefix)
}
```

However, the disclosure is not limited to the above example. In addition to the pieces of configuration information described above, various parameters related to a bandwidth part may be configured for the terminal. The pieces of information may be transferred by the base station to the terminal through higher layer signaling, for example, radio resource control (RRC) signaling. At least one bandwidth part among the configured one bandwidth part or plurality of bandwidth parts may be activated. Whether the configured bandwidth part is activated may be semi-statically transferred from the base station to the terminal through RRC signaling, or dynamically transferred through downlink control information (DCI).

According to embodiments, an initial bandwidth part (BWP) for an initial access may be configured for the terminal before a radio resource control (RRC) connection by the base station through a master information block (MIB). More specifically, a terminal may receive configuration information relating to a control resource set (CORESET) and a search space, in which a PDCCH may be transmitted, the PDCCH being designed for the terminal to receive system information (the system information may correspond to remaining system information (RMSI) or system information block 1 (SIB1)) required for an initial access through an MIB in an initial access stage. A control resource set and a search space that are configured through an MIB may be assumed to be identifiers (identities, IDs) 0. The base station may notify the terminal of configuration information such as frequency allocation information, time allocation information, and numerology for control resource set #0 through an MIB. In addition, the base station may notify, through an MIB, the terminal of configuration information relating to a monitoring period and occasion for control resource set #0, that is, configuration information relating to search space #0. The terminal may consider a frequency region configured to be control resource set #0 obtained from an MIB, as an initial bandwidth part for an initial access. The identity (ID) of the initial bandwidth part may be considered to be 0.

The bandwidth part configuration supported by 5G may be used for various purposes.

According to embodiments, if a bandwidth supported by the terminal is smaller than a system bandwidth, the terminal may be supported through the bandwidth part configuration. For example, the base station may configure the frequency location (configuration information 2) of a bandwidth part for the terminal so that the terminal transmits or receives data at a particular frequency location in a system bandwidth.

In addition, according to embodiments, the base station may configure a plurality of bandwidth parts for a terminal in order to support different numerologies. For example, in order to support, to a terminal, both data transmission/reception using a subcarrier spacing of 15 KHz and data transmission/reception using a subcarrier spacing of 30 KHz, the base station may configure, for the terminal, two bandwidth parts having a subcarrier spacing of 15 KHz and a subcarrier spacing of 30 KHz, respectively. Different bandwidth parts may undergo frequency division multiplexing, and if the terminal and the base station are to transmit or receive data using a particular subcarrier spacing, a bandwidth part configured to have the subcarrier spacing may be activated.

In addition, according to embodiments, the base station may configure bandwidth parts having different bandwidths for the terminal in order to reduce the power consumption of the terminal. For example, if the terminal supports a very wide bandwidth, for example, a bandwidth of 100 MHz, and always transmits or receives data through the bandwidth, the terminal may consume a very large quantity of power. Particularly, unnecessary monitoring of a downlink control channel in a large bandwidth of 100 MHz under no traffic may be very inefficient in view of power consumption. In order to reduce the power consumption of a terminal, the base station may configure a bandwidth part having a relatively small bandwidth, for example, a bandwidth part having 20 MHz for the terminal. If there is no traffic, the terminal may monitor a 20 MHz bandwidth part, and if data is generated, the terminal may transmit or receive the data through a 100 MHz bandwidth part according to an indication of the base station.

In relation to a method for configuring a bandwidth part described above, terminals before RRC-connected may receive configuration information of an initial bandwidth part through a master information block (MIB) in an initial access stage. More specifically, a control resource set (CORESET) for a downlink control channel through which downlink control information (DCI) scheduling a system information block (SIB) can be transmitted may be configured for the terminal through an MIB of a physical broadcast channel (PBCH). The bandwidth of the control resource set configured by the MIB may be considered as an initial bandwidth part, and the terminal may receive a physical downlink shared channel (PDSCH) through which the SIB is transmitted, through the configured initial bandwidth part. An initial bandwidth part may be used for other system information (OSI), paging, and random access in addition to the reception of a SIB.

Next, a synchronization signal (SS)/PBCH block in 5G is described.

An SS/PBCH block may denote a physical layer channel block including a primary SS (PSS), a secondary SS (SSS), and a PBCH. Specifically, an SS/PBCH block is described as below.

PSS: A PSS is a signal serving as a criterion of downlink time/frequency synchronization, and provides partial information of a cell ID.

SSS: An SSS is a signal serving as a criterion of downlink time/frequency synchronization, and provides the remaining cell ID information which is not provided by a PSS. Additionally, an SSS may serve as a reference signal for demodulation of a PBCH.

PBCH: A PBCH provides essential system information required for transmission/reception for a data channel and a control channel of a terminal. The essential system information may include search space-related control information indicating wireless resource mapping information of a control channel, and scheduling control information relating to a separate data channel through which system information is transmitted.

SS/PBCH block: An SS/PBCH block is configured by a combination of a PSS, an SSS, and a PBCH. One or a plurality of SS/PBCH blocks may be transmitted within a time of 5 ms, and each of transmitted SS/PBCH blocks may be identified by index.

The terminal may detect a PSS and an SSS in an initial access stage, and may decode a PBCH. The terminal may obtain MIB from the PBCH, and control resource set (CORESET) #0 (this may correspond to a control resource set having a control resource set index of 0) may be configured for the terminal from the MIB. The terminal may monitor control resource set #0 under the assumption that an SS/PBCH block selected by the terminal and a demodulation reference signal (DMRS) transmitted in control resource set #0 are quasi-co-located (QCL). The terminal may receive system information through downlink control information transmitted in control resource set #0. The terminal may obtain random access channel (RACH)-related configuration information for initial access from the received system information. The terminal may transmit a physical RACH (PRACH) to the base station in consideration of the selected SS/PBCH index, and the base station that received the PRACH may obtain information relating to the index of the SS/PBCH block selected by the terminal. The base station may identify that the terminal selects a block among SS/PBCH blocks, and monitors control resource set #0 associated with the block.

In the following description, downlink control information (DCI) in a 5G system will be explained in detail.

In a 5G system, scheduling information on uplink data (or physical uplink data channel (physical uplink shared channel, PUSCH)) or downlink data (or physical downlink data channel (physical downlink shared channel, PDSCH)) is transferred through DCI from a base station to a terminal. The terminal may monitor a fallback DCI format and a non-fallback DCI format for a PUSCH or a PDSCH. The fallback DCI format may be configured by a fixed field pre-defined between a base station and a terminal, and the non-fallback DCI format may include a configurable field.

DCI may undergo a channel coding and modulation process, and then be transmitted through a physical downlink control channel (PDCCH). A cyclic redundancy check (CRC) may be attached to a DCI message payload, and the CRC may be scrambled by a radio network temporary identifier (RNTI) corresponding to the identity of the terminal. Different types of RNTIs may be used according to the purpose of a DCI message, for example, UE-specific data transmission, a power control command, a random access response, or the like. That is, a RNTI is not explicitly transmitted, and is transmitted after being included in a CRC calculation process. If the terminal has received a DCI message transmitted on a PDCCH, the terminal may identify a CRC by using an assigned RNTI, and if a CRC identification result is correct, the terminal may identify that the message has been transmitted to the terminal.

For example, DCI scheduling a PDSCH, for system information (SI) may be scrambled by a SI-RNTI. DCI scheduling a PDSCH for a random access response (RAR) message may be scrambled by a RA-RNTI. DCI scheduling a PDSCH for a paging message may be scrambled by a P-RNTI. DCI notifying of a slot format indicator (SFI) may be scrambled by a SFI-RNTI. DCI notifying of a transmit power control (TPC) may be scrambled by a TPC-RNTI. DCI scheduling a UE-specific PDSCH or PUSCH may be scrambled by a cell RNTI (C-RNTI).

DCI format 0_0 may be used for fallback DCI scheduling a PUSCH, and in this case, a CRC may be scrambled by a C-RNTI. DCI format 0_0 having a CRC scrambled by a C-RNTI may include, for example, pieces of information below.

TABLE 3

Identifier for DCI formats-[1] bit
Frequency domain resource assignment-[⌈log$_2$(N$_{RB}^{UL,BWP}$(N$_{RB}^{UL,BWP}$ + 1)/2⌉] bits
Time domain resource assignment-X bits
Frequency hopping flag-1 bit.
Modulation and coding scheme-5 bits
New data indicator-1 bit
Redundancy version-2 bits
HARQ process number-4 bits
TPC command for scheduled PUSCH (wherein TPC indicates transmit power control)-[2] bits
UL/SUL indicator (uplink/supplementary uplink indicator)-0 or 1 bit DCI format 0_1 may be used for non-fallback DCI scheduling a PUSCH, and in this case, a CRC may be scrambled by a C-RNTI. DCI format 0_1 having a CRC scrambled by a C-RNTI may include, for example, pieces of information below.

TABLE 3

Carrier indicator-0 or 3 bits
UL/SUL indicator-0 or 1 bit
Identifier for DCI formats-[1] bits
Bandwidth part indicator-0, 1 or 2 bits
Frequency domain resource assignment
For resource allocation type 0, ⌈N$_{RB}^{UL,BWP}$/P⌉ bits
For resource allocation type 1, ⌈log$_2$(N$_{RB}^{UL,BWP}$(N$_{RB}^{UL,BWP}$ + 1)/2)⌉ bits
Time domain resource assignment-1, 2, 3, or 4 bits
VRB-to-PRB mapping (mapping between virtual resource block and physical resource block)-0 or 1 bit, only for resource allocation type 1.
 0 bit if only resource allocation type 0 is configured;
 1 bit otherwise.
Frequency hopping flag-0 or 1 bit, only for resource allocation type 1.
 0 bit if only resource allocation type 0 is configured;
 1 bit otherwise.
Modulation and coding scheme-5 bits
New data indicator-1 bit
Redundancy version-2 bits
HARQ process number-4 bits
1st downlink assignment index-1 or 2 bits
 1 bit for semi-static HARQ-ACK codebook;
 2 bits for dynamic HARQ-ACK codebook with single HARQ-ACK codebook.
2nd downlink assignment index-0 or 2 bits
 2 bits for dynamic HARQ-ACK codebook with two HARQ-ACK sub-codebooks;
 0 bit otherwise.
TPC command for scheduled PUSCH-2 bits SRS resource indicator- $\left\lceil \log_2\left(\sum_{k=1}^{L_{max}} \binom{N_{SRS}}{k}\right)\right\rceil$ or ⌈log$_2$(N$_{SRS}$)⌉ bits $\left\lceil \log_2\left(\sum_{k=1}^{L_{max}} \binom{N_{SRS}}{k}\right)\right\rceil$ bits for non-codebook based PUSCH transmission(if PUSCH transmission is not based on codebook);
 ⌈log$_2$(N$_{SRS}$)⌉ bits for codebook based PUSCH transmission(if PUSCH transmission is based on codebook).
Precoding information and number of layers-up to 6 bits
Antenna ports-up to 5 bits
SRS request-2 bits
CSI request (wherein CSI indicates channel state information)-0, 1, 2, 3, 4, 5, or 6 bits
CBG transmission information (wherein CBG indicates code block group)-0, 2, 4, 6, or 8 bits
PTRS-DMRS association (wherein PTRS indicates phase tracking reference signal and DMRS indicates demodulation reference signal)-0 or 2 bits.
beta_offset indicator-0 or 2 bits
DMRS sequence initialization (wherein DMRS indicates demodulation reference signal)-0 or 1 bit DCI format 1_0 may be used for fallback DCI scheduling a PDSCH, and in this case, a CRC may be scrambled by a C-RNTI. DCI format 1_0 having a CRC scrambled by a C-RNTI may include, for example, pieces of information below.

TABLE 5

Identifier for DCI formats-[1] bits
Frequency domain resource assignment-[⌈log$_2$(N$_{RB}^{DL,BWP}$ (N$_{RB}^{DL,BWP}$ + 1)/2⌉] bits
Time domain resource assignment-X bits
VRB-to-PRB mapping-1 bit.
Modulation and coding scheme-5 bits
New data indicator-1 bit
Redundancy version-2 bits
HARQ process number-4 bits
Downlink assignment index-2 bits
TPC command for scheduled PUCCH-[2] bits TABLE 5-continued PUCCH resource indicator (wherein PUCCH indicates physical uplink control channel)-3 bits
PDSCH-to-HARQ feedback timing indicator-[3] bits DCI format 1_1 may be used for non-fallback DCI scheduling a PDSCH, and in this case, a CRC may be scrambled by a C-RNTI. DCI format 1_1 having a CRC scrambled by a C-RNTI may include, for example, pieces of information below.

TABLE 6

Carrier indicator-0 or 3 bits
Identifier for DCI formats-[1] bits
Bandwidth part indicator-0, 1 or 2 bits
Frequency domain resource assignment
For resource allocation type 0, $[N_{RB}^{DL,BWP}/P]$ bits
For resource allocation type 1, $\lceil \log_2(N_{RB}^{DL,BWP} (N_{RB}^{DL,BWP} +1)/2 \rceil$ bits
Time domain resource assignment-1, 2, 3, or 4 bits
VRB-to-PRB mapping-0 or 1 bit, only for resource allocation type 1.
0 bit if only resource allocation type 0 is configured;
1 bit otherwise.
PRB bundling size indicator (wherein PRB indicates physical resource
block-0 or 1 bit
Rate matching indicator-0, 1, or 2 bits
ZP CSI-RS trigger (wherein ZP CSI-RS indicates zero power channel state information-reference signal)-0, 1, or 2 bits
For transport block 1:
Modulation and coding scheme-5 bits
New data indicator-1 bit
Redundancy version-2 bits
For transport block 2:
Modulation and coding scheme-5 bits
New data indicator-1 bit
Redundancy version-2 bits
HARQ process number-4 bits
Downlink assignment index-0 or 2 or 4 bits
TPC command for scheduled PUCCH-2 bits
PUCCH resource indicator-3 bits TABLE 6-continued PDSCH-to-HARQ feedback timing indicator-3 bits
Antenna ports-4, 5 or 6 bits
Transmission configuration indication-0 or 3 bits
SRS request-2 bits
CBG transmission information-0, 2, 4, 6, or 8 bits
CBG flushing out information (wherein CBG indicates code block group)-0 or 1 bit
DMRS sequence initialization-1 bit Hereinafter, a method for assigning time domain resources for a data channel in a 5G communication system will be described.

A base station may configure, for a terminal, a table relating to time domain resource allocation information for a downlink data channel (physical downlink shared channel, PDSCH) and an uplink data channel (physical uplink shared channel, PUSCH) through higher layer signaling (e.g. RRC signaling). The base station may configure, for a PDSCH, a table configured by a maximum of 16 entries (maxNrofDL-Allocations=16), and may configure, for a PUSCH, a table configured by a maximum of 16 entries (maxNrofUL-Allocations=16). Time domain resource allocation (TD-RA) information may include, for example, PDCCH-to-PDSCH slot timing (a time interval expressed in the units of slots, between a time point at which a PDCCH is received, and a time point at which a PDSCH scheduled by the received PDCCH is transmitted, the timing is indicated by $K_0$) or PDCCH-to-PUSCH slot timing (i.e. a time interval expressed in the units of slots, between a time point at which a PDCCH is received, and a time point at which a PUSCH scheduled by the received PDCCH is transmitted, the timing is indicated by $K_2$), information relating to the location of a starting symbol of a PDSCH or a PUSCH scheduled in a slot, and the scheduled length, a mapping type of a PDSCH or a PUSCH, and the like. For example, a terminal may be notified of pieces of information as shown in Tables 7 and 8 below by a base station.

TABLE 7

PDSCH-TimeDomainResourceAllocationList information element

PDSCH-TimeDomainResourceAllocationList ::=      SEQUENCE
(SIZE(1 ..maxNrofDL-Allocations)) OF PDSCH-TimeDomainResourceAllocation
    PDSCH-TimeDomainResourceAllocation ::=      SEQUENCE {
    k0                                          INTEGER(0..32)
OPTIONAL,    -- Need S
        (PDCCH-to-PDSCH timing in units of slots)
    mappingType                                 ENUMERATED {typeA, typeB },
        (PDSCH mapping type)
    startSymbolAndLength                        INTEGER (0.. 127)
    (The length and a starting symbol of a PDSCH)
}

TABLE 8

PUSCH-TimeDomainResourceAllocation information element

PUSCH-TimeDomainResourceAllocationList ::=    SEQUENCE
(SIZE(1 ..maxNrofUL-Allocations)) OF PUSCH-TimeDomainResourceAllocation
    PUSCH-TimeDomainResourceAllocation ::=     SEQUENCE {
    k2                                         INTEGER(0..32)
OPTIONAL,    -- Need S
        (PDCCH-to-PUSCH timing in units of slots)
        mappingType                            ENUMERATED {typeA,
typeB},
        (PUSCH mapping type)

TABLE 8-continued

PUSCH-TimeDomainResourceAllocation information element startSymbolAndLength INTEGER (0.. 127)
   (The length and a starting symbol of a PUSCH)
}

The base station may notify the terminal of one of the entries of the table relating to the time domain resource allocation information through L1 signaling (e.g. DCI) (e.g. the base station may indicate one of the entries to the terminal through a time domain resource allocation field in DCI). The terminal may obtain time domain resource allocation information relating to a PDSCH or PUSCH, based on DCI received from the base station.

Hereinafter, a downlink control channel of a 5G communication system will be described in detail with reference to the drawings.

A control resource set in 5G, described above may be configured for a terminal by a base station through higher layer signaling (e.g. system information, master information block (MIB), and radio resource control (RRC) signaling). Configuring of a control resource set for a terminal means providing of information such as a control resource set identity, the frequency location of the control resource set, the symbol length of the control resource set, etc. For example, the information may include pieces of information below.

TABLE 9

Figure 4:
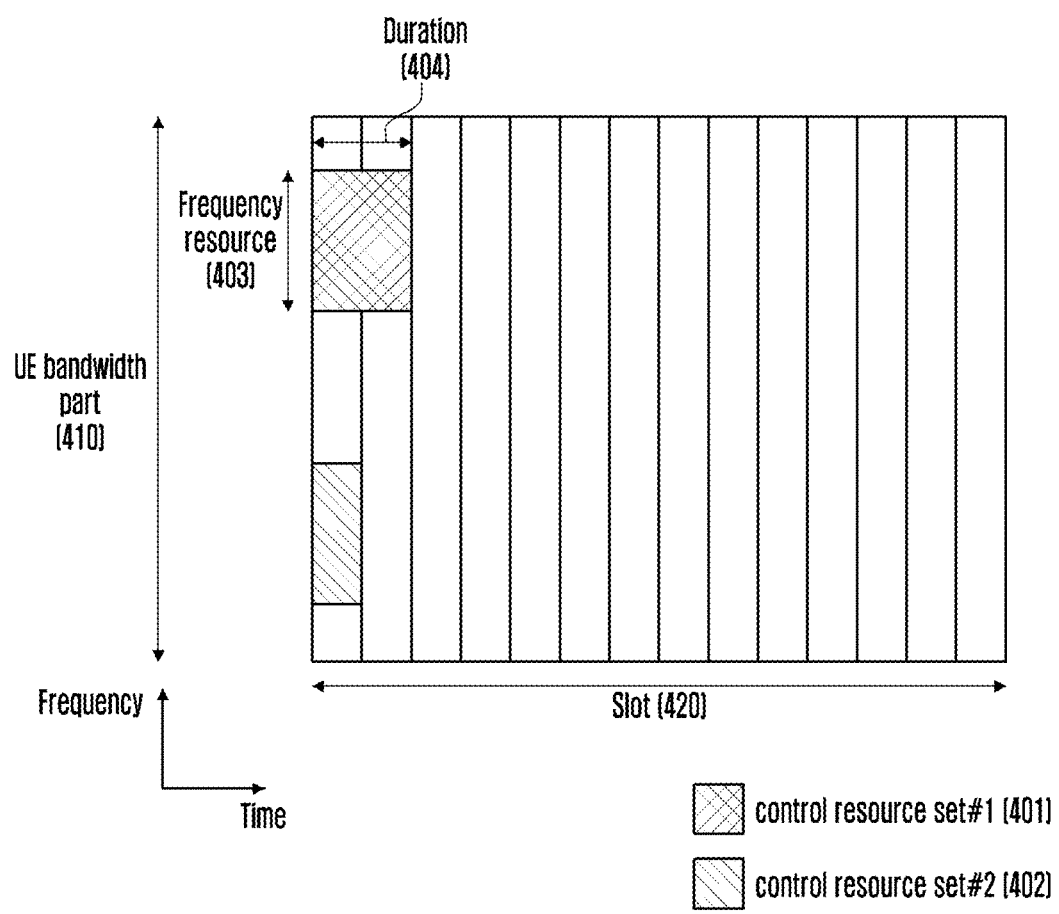
FIG. 4 illustrates an example of a control resource set configuration of a downlink control channel in 5G.

ControlResourceSet ::= SEQUENCE {
-- Corresponds to L1 parameter 'CORESET-ID'
controlResourceSetId                    ControlResourceSetId,
   (control resource set identifier (Identity))
     frequencyDomainResources            BIT STRING (SIZE (45)),
       (frequency axis resource allocation information)
     duration                               INTEGER (1 ..maxCoReSetDuration),
       (time axis resource allocation information)
     cce-REG-MappingType                 CHOICE {
       (CCE-to-REG mapping scheme)
       interleaved                          SEQUENCE {
         reg-BundleSize                  ENUMERATED {n2, n3, n6},
         (REG bundle size)
         precoderGranularity            ENUMERATED {sameAsREG-
bundle, allContiguousRBs},
         interleaverSize                 ENUMERATED {n2, n3, n6}
         (interleaver size)
         shiftIndex
      INTEGER(0..maxNrofPhysicalResourceBlocks-1)
      OPTIONAL
         (interleaver shift)
       },
       nonInterleaved                  NULL
     },
     tci-StatesPDCCH                    SEQUENCT(SIZE   (1 ..maxNrofTCI-
StatesPDCCH)) OF TCI-StateId          OPTIONAL
       (QCL configuration information)
     tci-PresentInDCI                   ENUMERATED {enabled}
                                 OPTIONAL,     -- Need S FIG. 4 illustrates an example of a control resource set (CORESET) on which a downlink control channel is transmitted, in a 5G wireless communication system. FIG. 4 shows an example in which a bandwidth part (UE bandwidth part) 410 of a terminal is configured along a frequency axis and two control resource sets (UE)(control resource set #1 401 and control resource set #2 402) are configured in one slot 420 along a time axis. The control resource sets 401 and 402 may be configured on a particular frequency resource 403 in the entire terminal bandwidth part 410 along the frequency axis. The control resource sets 401 and 402 may be configured by one OFDM symbol or a plurality of OFDM symbols along the time axis, and the configured OFDM symbol or symbols may be defined as a control resource set duration 404. With reference to the example illustrated in FIG. 4, control resource set #1 401 is configured to have a control resource set duration of two symbols, and control resource set #2 402 is configured to have a control resource set duration of one symbol.

In Table 9, tci-StatesPDCCH (simply, referred to as a transmission configuration indication (TCI) state) configuration information may include information on the index or indices of one or multiple synchronization signal/physical broadcast channel (SS/PBCH) blocks having a quasi-co-located (QCL) relationship with a DMRS transmitted on a corresponding control resource set, or information on the index of a channel state information reference signal (CSI-RS).

Figure 5:
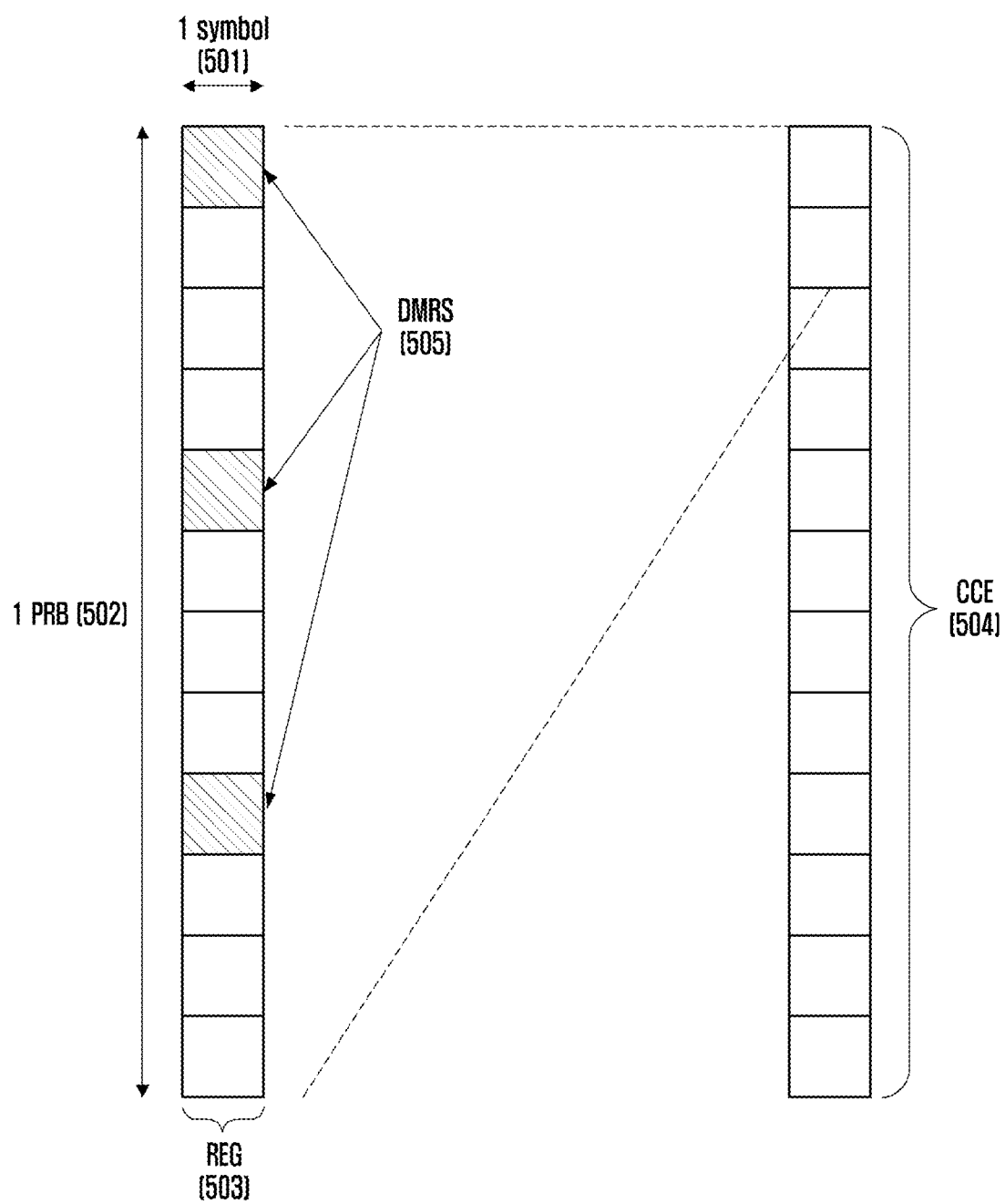
FIG. 5 illustrates a structure of a downlink control channel in 5G.

FIG. 5 illustrates an example of a basic unit of time and frequency resources configuring a downlink control channel, which can be used in 5G. As illustrated in FIG. 5, a basic unit of time and frequency resources configuring a control channel may be named a resource element group (REG) 503, and the REG 503 may be defined as one OFDM symbol 501 in a time axis and one physical resource block (PRB) 502 in a frequency axis, that is, may be defined as, 12 subcarriers. A base station connects and attaches REGs 503 described above to each other to configure a downlink control channel assignment unit.

As illustrated in FIG. 5, if a basic unit for the assignment of a downlink control channel in 5G is a control channel element (CCE) 504, one CCE 504 may be configured by a plurality of the REGs 503. For example, the REG 503 illustrated in FIG. 5 may be configured by 12 REs, and if one CCE 504 is configured by six REGs 503, the one CCE 504 may be configured by 72 REs. If a downlink control resource set is configured, the resource set may be configured by a plurality of CCEs 504, and a particular downlink control channel may be transmitted after being mapped to one CCE 504 or a plurality of CCEs 504 according to an aggregation level (AL) in the control resource set. CCEs 504 in a control resource set are distinguished by numbers, and the numbers of the CCEs 504 may be assigned according to a logical mapping scheme.

The basic unit of a downlink control channel, illustrated in FIG. 5, that is, an REG 503, may include REs to which DCI is mapped and a region to which a DMRS 505, which is a reference signal for decoding the REs, is mapped. As illustrated in FIG. 5, three DMRSs 505 may be transmitted in one REG 503. The number of CCEs required for transmitting a PDCCH may be 1, 2, 4, 8, and 16 according to aggregation levels (ALs), and different numbers of CCEs may be used to implement the link adaptation of the downlink control channel. For example, if AL=L, one downlink control channel may be transmitted through L number of CCEs. A terminal is required to detect a signal in the state where the terminal does not know information relating to a downlink control channel, and a search space indicating a set of CCEs is defined for blind decoding. A search space is a set of downlink control channel candidates configured by CCEs to which the terminal is required to attempt to decode at a given aggregation level. Since there are various aggregation levels grouping 1, 2, 4, 8, and 16 CCEs into one, respectively, the terminal may have a plurality of search spaces. A search space set may be defined to be a set of search spaces at all the configured aggregation levels.

Search spaces may be classified into a common search space and a UE-specific search space. A particular group of terminals or all the terminals may investigate a common search space for a PDCCH to receive cell-common control information such as a paging message or dynamic scheduling for system information. For example, the terminals may investigate a common search space for a PDCCH to receive PDSCH scheduling assignment information for transmission of a SIB including cell operator information. In the case of a common search space, a particular group of terminals or all the terminals are required to receive a PDCCH, and thus the common search space may be defined to be a pre-promised set of CCEs. The terminals may investigate a UE-specific search space for a PDCCH to receive scheduling assignment information for a UE-specific PDSCH or PUSCH. A UE-specific search space may be defined UE-specifically by using the identity of a terminal and the functions of various system parameters.

In 5G, a parameter for a search space for a PDCCH may be configured for a terminal by a base station through higher layer signaling (e.g. SIB, MIB, and RRC signaling) For example, the base station may configure, for the terminal, the number of PDCCH candidates at each aggregation level L, a monitoring period for a search space, a monitoring occasion expressed in the units of symbols in a slot of a search space, a search space type (common search space or UE-specific search space), a combination of an RNTI and a DCI format to be monitored in a corresponding search space, and the index of a control resource set in which a search space is to be monitored. For example, the configuration may include pieces of information below.

TABLE 10

```
SearchSpace ::=                        SEQUENCE {
-- Identity of the search space. SearchSpaceId = 0 identifies the SearchSpace
configured via PBCH (MIB) or ServingCellConfigCommon.
    searchSpaceId                      SearchSpaceId,
        (search space identifier)
    controlResourceSetId               ControlResourceSetId,
        (control resource set identifier)
    monitoringSlotPeriodicityAndOffset CHOICE {
        (monitoring slot level period)
        sl1                            NULL,
        sl2                            INTEGER (0.. 1),
        sl4                            INTEGER (0..3),
        sl5                            INTEGER (0..4),
        sl8                            INTEGER (0.. 7),
        sl10                           INTEGER (0..9),
        sl16                           INTEGER (0.. 15),
        sl20                           INTEGER (0.. 19)
    }
                            OPTIONAL,
    duration(Monitoring duration)      INTEGER (2..2559)
    monitoringSymbolsWithinSlot        BIT STRING (SIZE (14))
                            OPTIONAL,
        (monitoring symbols in slot)
    nrofCandidates                     SEQUENCE {
        (the number of PDCCH candidates for each aggregation level)
        aggregationLevel1              ENUMERATED {n0, n1, n2, n3, n4, n5, n6, n8},
        aggregationLevel2              ENUMERATED {n0, n1, n2, n3, n4, n5, n6, n8},
        aggregationLevel4              ENUMERATED {n0, n1, n2, n3, n4, n5, n6, n8},
        aggregationLevel8              ENUMERATED {n0, n1, n2, n3, n4, n5, n6, n8},
        aggregationLevel16             ENUMERATED {n0, n1, n2, n3, n4, n5, n6, n8}
    },
```

TABLE 10-continued

```
searchSpaceType                CHOICE {
(search space type)
    -- Configures this search space as common search space (CSS) and DCI formats
to monitor.
    common                     SEQUENCE {
(common search space)
    }
    ue-Specific                SEQUENCE {
(UE-specific search space)
        -- Indicates whether the UE monitors in this USS for DCI formats 0-0 and 1-
0 or for formats 0-1 and 1-1
        formats                ENUMERATED {formats0-0-And-
1-0, formats0-1-And-1-1},
        . . .
    }
}
```

The base station may configure one search space set or a plurality of search space sets for the terminal according to the configuration information. According to embodiments, the base station may configure, for the terminal, search space set 1 and search space set 2, in search space set 1, DCI format A scrambled by X-RNTI may be configured to be monitored in a common search space, and in search space set 2, DCI format B scrambled by Y-RNTI may be configured to be monitored in a UE-specific search space.

According to the configuration information, one search space set or a plurality of search space sets may exist in a common search space or a UE-specific search space. For example, search space set #1 and search space set #2 may be configured to be common search spaces, and search space set #3 and search space set #4 may be configured to be UE-specific search spaces.

In a common search space, combinations of a DCI format and a RNTI as below may be monitored. However, the disclosure is not limited to the example above.

DCI format 0_0/1_0 with CRC scrambled by C-RNTI, CS-RNTI, SP-CSI-RNTI, RA-RNTI, TC-RNTI, P-RNTI, SI-RNTI.
DCI format 2_0 with CRC scrambled by SFI-RNTI.
DCI format 2_1 with CRC scrambled by INT-RNTI.
DCI format 2_2 with CRC scrambled by TPC-PUSCH-RNTI, TPC-PUCCH-RNTI.
DCI format 2_3 with CRC scrambled by TPC-SRS-RNTI.

In a UE-specific search space, combinations of a DCI format and a RNTI as below may be monitored. However, the disclosure is not limited to the example above.

DCI format 0_0/1_0 with CRC scrambled by C-RNTI, CS-RNTI, TC-RNTI.
DCI format 1_0/1_1 with CRC scrambled by C-RNTI, CS-RNTI, TC-RNTI.

The described types of RNTIs may follow the definitions and purposes below.

Cell RNTI (C-RNTI): the purpose of scheduling a UE-specific PDSCH.
Temporary Cell RNTI (TC-RNTI): the purpose of scheduling a UE-specific PDSCH.
Configured Scheduling RNTI (CS-RNTI): the purpose of scheduling semi-statically configured UE-specific PDSCH.
Random Access RNTI (RA-RNTI): the purpose of scheduling a PDSCH in a random access stage.
Paging RNTI (P-RNTI): the purpose of scheduling a PDSCH on which paging is transmitted.
System Information RNTI (SI-RNTI): the purpose of scheduling a PDSCH on which system information is transmitted.

Interruption RNTI (INT-RNTI): the purpose of notifying of whether a PDSCH is punctured Transmit Power Control for PUSCH RNTI (TPC-PUSCH-RNTI): the purpose of indicating a power control command for a PUSCH.
Transmit Power Control for PUCCH RNTI (TPC-PUCCH-RNTI): the purpose of indicating a power control command for a PUCCH.
Transmit Power Control for SRS RNTI (TPC-SRS-RNTI): the purpose of indicating a power control command for an SRS.

The described DCI formats may follow the definitions below.

TABLE 11

| DCI format | Usage |
| --- | --- |
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

In 5G, a search space of aggregation level L in control resource set p and search space set s may be expressed as in equation below.

$$L \cdot \left\{ \left( Y_{p,n_{s,f}^\mu} + \left\lfloor \frac{m_{s,n_{CI}} \cdot N_{CCE,p}}{L \cdot M_{p,s,max}^{(L)}} \right\rfloor + n_{CI} \right) \mod \lfloor N_{CCE,p} / L \rfloor \right\} + i \quad \text{[Equation 1]}$$

L: aggregation level;
$n_{CI}$: carrier index;
$N_{CCE,p}$: the total number of CCEs existing in control resource set p;
$n_{s,f}^\mu$: slot index;
$M_{p,s,max}^{(L)}$: the number of PDCCH candidates of aggregation level L;
$m_{s,n_{CI}}=0, \ldots, M_{p,s,max}^{(L)}-1$: the indice of PDCCH candidates of aggregation level L;
$i=0, \ldots, L-1$;
$Y_{p,n_{s,f}^\mu}=(A_p \cdot Y_{p,n_{s,f}^\mu-1}) \mod D$, $Y_{p,-1}=n_{RNTI} \neq 0$, $A_0=39827$, $A_1=39829$, $A_2=39839$, $D=65537$
$n_{RNTI}$: terminal identifier.
In a case of a common search space, $Y\_(p,n_{s,f}^\mu)$ may be 0.

In a case of a UE-specific search space, Y_(p,nµs,f) may be changed according to a time index and the identity (C-RNTI or ID configured for a terminal by a base station) of a terminal.

In 5G, a plurality of search space sets may be configured by different parameters (e.g. the parameters in Table 10). Therefore, a set of search space sets monitored by a terminal may be changed at every time point. For example, if search space set #1 is configured to have an X-slot period, search space set #2 is configured to have an Y-slot period, and X is different from Y, a terminal may monitor both search space set #1 and search space set #2 in a particular slot, and may monitor one of search space set #1 and search space set #2 in a particular slot.

If a plurality of search space sets are configured for a terminal, the conditions below may be considered in a method for determining a search space set required to be monitored by the terminal.

[Condition 1: Limitation of the Maximum Number of PDCCH Candidates]

The number of PDCCH candidates that can be monitored per slot does not exceed $M^\mu$. $M^\mu$ may be defined to be the maximum number of PCDDH candidates per slot in a cell configured to have subcarrier spacing of $15 \cdot 2^\mu$ kHz, and may be defined as shown in table 12 below.

TABLE 12

| µ | Maximum number of PDCCH candidates per slot and per serving cell ($M^\mu$) |
|---|---|
| 0 | 44 |
| 1 | 36 |
| 2 | 22 |
| 3 | 20 |

[Condition 2: Limitation of the Maximum Number of CCEs]

The number of CCEs configuring an entire search space (herein, the entire search space denotes all CCE sets corresponding to a union region of a plurality of search space sets) per slot does not exceed $C^\mu$. $C^\mu$ may be defined to be the maximum number of CCEs per slot in a cell configured to have subcarrier spacing of $15 \cdot 2^\mu$ kHz, and may be defined as shown in Table 13 below.

TABLE 13

| µ | Maximum number of CCEs per slot and per serving cell ($C^\mu$) |
|---|---|
| 0 | 56 |
| 1 | 56 |
| 2 | 48 |
| 3 | 32 |

For convenience of explanation, "condition A" is defined as a situation satisfying both conditions 1 and 2 at a particular time point. Therefore, non-satisfaction of condition A may imply non-satisfaction of at least one of conditions 1 and 2.

A case which does not satisfy condition A at a particular time point may occur according to a configuration of search space sets by the base station. If condition A is not satisfied at a particular time point, the terminal may select and monitor only a part of search space sets configured to satisfy condition A at the time point, and the base station may transmit a PDCCH through the selected part of search space sets.

A method of selecting some search spaces of all configured search space sets may follow the methods below.

[Method 1]

In a case where condition A relating to a PDCCH is not satisfied at a particular time point (slot), a terminal (a base station) may select a search space set configured to have a search space type of a common search space among search space sets existing at the time point in preference to a search space set configured to have a search space type of a UE-specific search space.

If all search space sets configured as a common search space are selected (i.e. if condition A is satisfied even after all search spaces configured as a common search space are selected), the terminal (or the base station) may select search space sets configured as a UE-specific search space. If there are a plurality of search space sets configured as a UE-specific search space, the smaller the index of a search space set, the higher the priority of the search space set. UE-specific search space sets may be selected within a range of satisfying condition A in consideration of the priorities.

Figure 6:
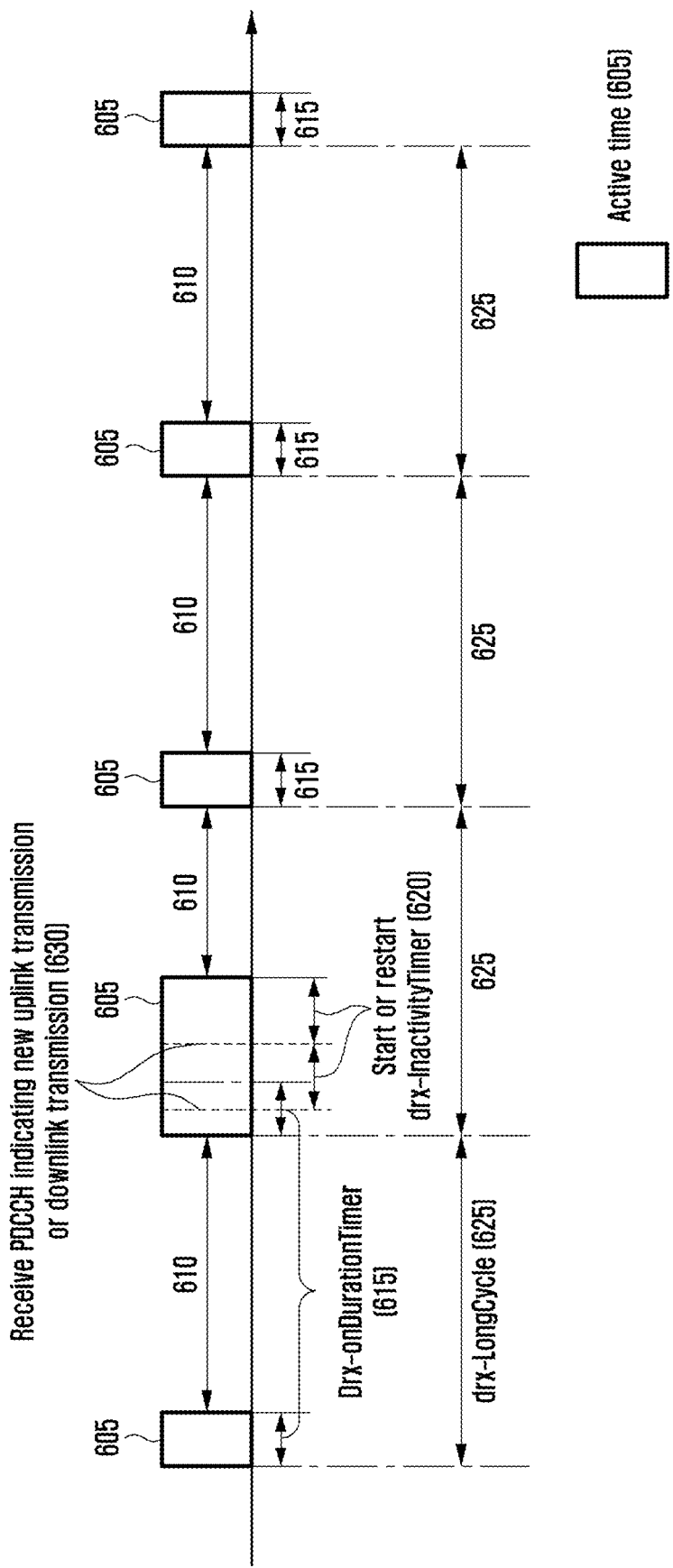
FIG. 6 illustrates an example of a DRX operation in 5G.

FIG. 6 illustrates a diagram of discontinuous reception (DRX).

The operation in FIG. 6 is an operation in which a terminal using a service discontinuously receives data in an RRC-connected state in which a wireless link is configured between a base station and the terminal. In a case where DRX is applied, the terminal may turn on a receiver at a particular time point to monitor a control channel. If there is no data received for a predetermined period, the terminal may turn off the receiver to reduce the power consumption of the terminal. A DRX operation may be controlled by a MAC layer device, based on various parameters and timers.

Referring to FIG. 6, an active time 605 is a time interval for which the terminal wakes up at DRX periods and monitors a PDCCH. The active time 605 may be defined as below.

drx-onDurationTimer or drx-InactivityTimer or drx-RetransmissionTimerDL or drx-RetransmissionTimerUL or ra-ContentionResolutionTimer is running;

a Scheduling Request is sent on PUCCH and is pending; or a PDCCH indicating a new transmission addressed to the C-RNTI of the MAC entity has not been received after successful reception of a Random Access Response for the Random Access Preamble not selected by the MAC entity among the contention-based Random Access Preamble A drx-onDurationTimer, drx-InactivityTimer, drx-RetransmissionTimerDL, drx-RetransmissionTimerUL, and ra-ContentionResolutionTimer are timers, the values of which are configured by the base station, and function to configure the terminal to monitor a PDCCH in a situation satisfying a predetermined condition.

A drx-onDurationTimer 615 is a parameter for configuring a minimum time interval in which the terminal is awake in a DRX cycle. A drx-InactivityTimer 620 is a parameter for configuring a time interval in which the terminal is additionally awake in a case 630 where a PDCCH indicating new uplink transmission or downlink transmission is received. A drx-RetransmissionTimerDL is a parameter for configuring a maximum time interval in which the terminal is awake to receive downlink retransmission in a downlink HARQ process. A drx-RetransmissionTimerUL is a parameter for configuring a maximum time interval in which the terminal is awake to receive a grant for uplink retransmission in an uplink HARQ process. A drx-onDurationTimer, drx-InactivityTimer, drx-RetransmissionTimerDL, and drx-RetransmissionTimerUL may be configured by, for example, a time, the number of subframes, or the number of slots. An ra-ContentionResolutionTimer is a parameter for monitoring a PDCCH in a random access process.

An inactive time 610 is a time interval configured not to monitor or receive a PDCCH in the DRX operation. The time interval remaining after subtracting the active time 605 from the entire time interval in which the DRX operation is performed may be the inactive time 610. If the terminal does not monitor a PDCCH during the active time 605, the terminal may enter a sleep or inactive state to reduce power consumption.

A DRX cycle denotes a period at which the terminal wakes up and monitors a PDCCH. That is, a DRX cycle denotes a time interval between monitoring of a PDCCH by the terminal and monitoring of a next PDCCH, or an on-duration occurrence period. There are two types of a DRX cycle, which are a short DRX cycle, and a long DRX cycle. A short DRX cycle may be optionally applied.

A long DRX cycle 625 is a long cycle among two types of DRX cycles configured for the terminal. While the terminal is operating in long DRX, the terminal restarts the drx-onDurationTimer 615 at a time point after passage of the long DRX cycle 625 from a start point (e.g. starting symbol) of the drx-onDurationTimer 615. If the terminal is operating in the long DRX cycle 625, the terminal may start the drx-onDurationTimer 615 in a slot after passage of a drx-SlotOffset in a subframe satisfying equation 2 below. The drx-SlotOffset implies a delay before the drx-onDuration-Timer 615 is started. The drx-SlotOffset may be configured by, for example, a time, or the number of slots.

$$[(SFN \times 10) + \text{subframe number}] \mod (drx\text{-Long-Cycle}) = drx\text{-StartOffset} \quad \text{[Equation 2]}$$

The long DRX cycle 625 and a drx-StartOffset may be used to define a subframe in which the long DRX cycle 625 starts. The long DRX cycle 625 and the drx-StartOffset may be configured in a RRC parameter, for example, drx-Long-CycleStartOffset. The drx-LongCycleStartOffset may be configured by, for example, a time, the number of subframes, or the number of slots.

Hereinafter, a method for configuring a TCI state relating to a PDCCH (or PDCCH DMRS) in a 5G communication system is specifically described.

A base station can configure and indicate a TCI state relating to a PDCCH (or PDCCH DMRS) through proper signaling. According to the above description, a base station can configure and indicate a TCI state relating to a PDCCH (or PDCCH DMRS) through proper signaling. The TCI state is configured or indicated to notify of a quasi-co-location (QCL) relationship between a PDCCH (or PDCCH DMRS) and another RS or a channel. The fact that a reference antenna port A (reference RS #A) and another target antenna port B (target RS #B) are QCLed to each other implies that a terminal is allowed to apply all or a part of large-scale channel parameters estimated in the antenna port A to perform a channel measurement in the antenna port B. QCL may require different parameters to be involved according to situations including 1) time tracking affected by average delay and delay spread, 2) frequency tracking affected by Doppler shift and Doppler spread, 3) radio resource management (RRM) affected by average gain, and 4) beam management (BM) affected by spatial parameter. Accordingly, NR supports four types of QCL relationships shown in Table 14 below.

TABLE 14

| QCL type | Large-scale characteristics |
| --- | --- |
| A | Doppler shift, Doppler spread, average delay, delay spread |
| B | Doppler shift, Doppler spread |
| C | Doppler shift, average delay |
| D | Spatial Rx parameter |

The spatial RX parameter may be a generic term for a part or all of various parameters including Angle of arrival (AoA), Power Angular Spectrum (PAS) of AoA, Angle of departure (AoD), PAS of AoD, transmit/receive channel correlation, transmit/receive beamforming, and spatial channel correlation.

The QCL relationship can be configured for the terminal through an RRC parameter TCI-State and QCL-Info as shown in Table 15 below. Referring to Table 15, the base station may configure at least one TCI state for the terminal to notify the terminal of a maximum of two QCL relationships (qcl-Type1 and qcl-Type2) relating to an RS referring to ID of the TCI state, that is, a target RS. Each of pieces of QCL information (QCL-Info) included in the TCI state includes a serving cell index and a BWP index of a reference RS indicated by a corresponding piece of QCL information, the type and ID of the reference RS, and a QCL type as shown in Table 14.

TABLE 15

```
TCI-State ::=           SEQUENCE {
tci-StateId             TCI-StateId,
(ID of the TCI state)
qcl-Type1               QCL-Info,
(QCL information of a first reference RS of an RS (target RS) referring to the TCI state
ID)
qcl-Type2               QCL-Info     OPTIONAL, --
Need R
(QCL information of a second reference RS of an RS (target RS) referring to the TCI
state ID)
. . .
}
QCL-Info ::=            SEQUENCE {
cell                    ServCellIndex    OPTIONAL,    -- Need R
(A serving cell index of a reference RS indicated by corresponding QCL information)
bwp-Id                  BWP-Id           OPTIONAL,    --
Cond CSI-RS-Indicated
(A BWP index of a reference RS indicated by corresponding QCL information)
```

TABLE 15-continued

```
referenceSignal        CHOICE {
    csi-rs                  NZP-CSI-RS-ResourceId,
    ssb                     SSB-Index
    (One of a CSI-RS ID or a SSB ID, indicated by corresponding QCL information)
},
qcl-Type               ENUMERATED {typeA, typeB, typeC, typeD},
...
}
```

Figure 7:
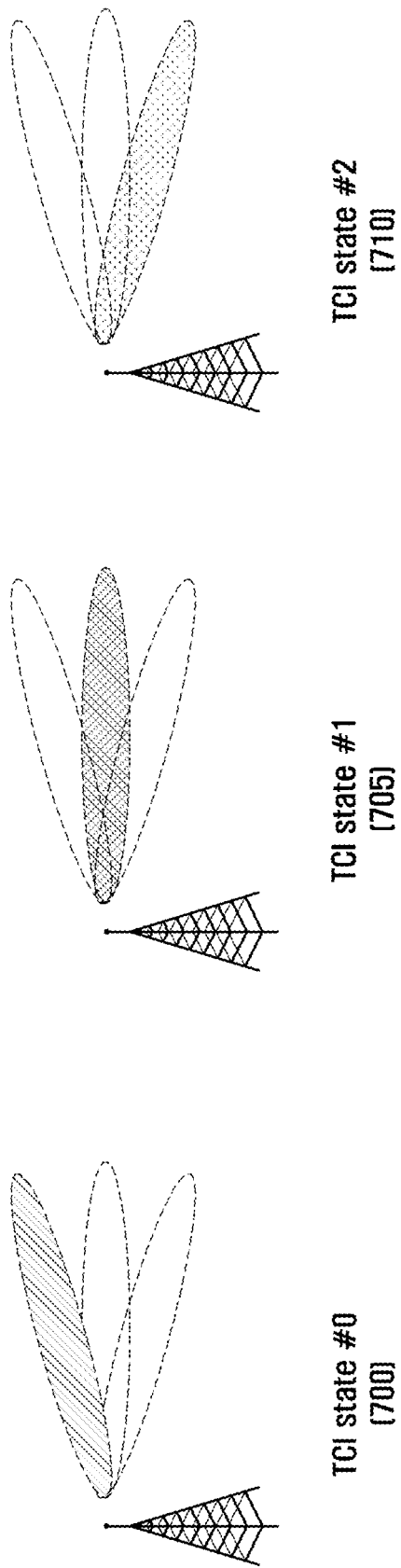
FIG. 7 illustrates an example of base station beam allocation according to a TCI state configuration in 5G.

FIG. 7 illustrates an example of base station beam allocation according to a TCI state configuration. Referring to FIG. 7, a base station may transfer pieces of information relating to N number of different beams through N number of different TCI states to a terminal. For example, as illustrated in FIG. 7, if N is 3, the base station may allow a qcl-Type 2 parameter included in each of three TCI states 700, 705, and 710 to be associated with a CSI-RS or SSB corresponding to different beams and to be configured to be of QCL type D, so as to notify that antenna ports referring to the different TCI states 700, 705, and 710 are associated with different spatial Rx parameters, that is, different beams. Specifically, a combination of TCI states applicable to a PDCCH DMRS antenna port is as shown in Table 16 below. In Table 16, a combination in the fourth row is assumed by the terminal before RRC configuration, and is unable to be configured after RRC.

TABLE 16

| Valid TCI state Configuration | DL RS 1 | qcl-Type1 (if configured) | DL RS 2 (if configured) | qcl-Type2 |
|---|---|---|---|---|
| 1 | TRS | QCL-TypeA | TRS | QCL-TypeD |
| 2 | TRS | QCL-TypeA | CSI-RS (BM) | QCL-TypeD |
| 3 | CSI-RS (CSI) | QCL-TypeA | | |
| 4 | SS/PBCH Block | QCL-TypeA | SS/PBCH Block | QCL-TypeD |

Figure 8:
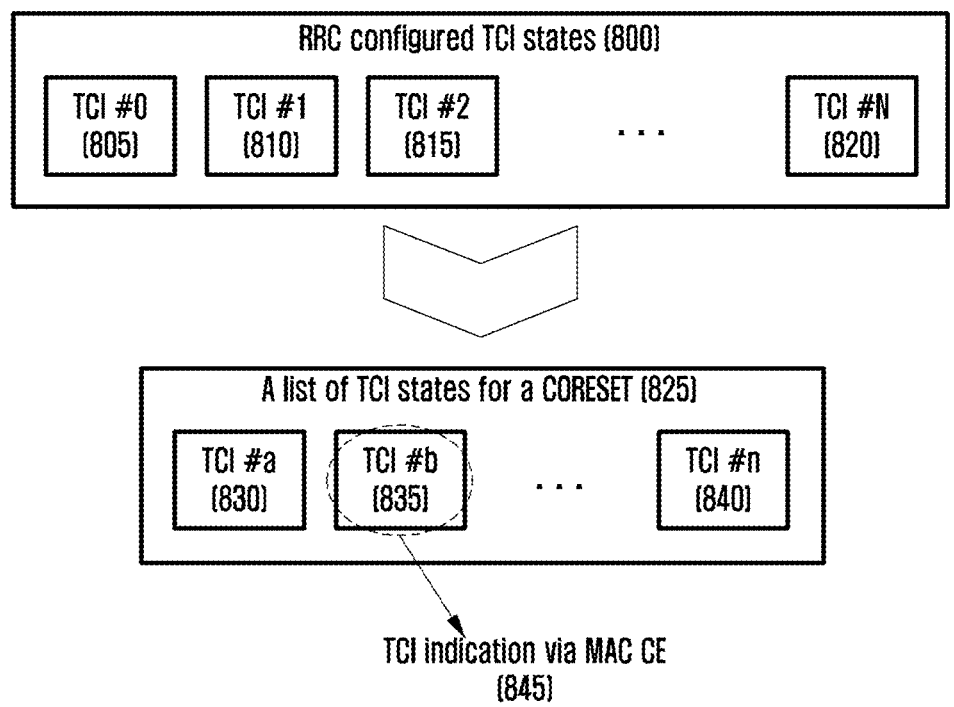
FIG. 8 illustrates an example of a method for assigning a TCI state for a PDCCH in 5G.

NR supports a hierarchical signaling method as illustrated in FIG. 8 for dynamic allocation of PDCCH beams. Referring to FIG. 8, a base station may configure N number of TCI states 805, 810, . . . , and 820 for a terminal through RRC signaling (as indicated by reference numeral 800), and may configure some of the TCI states as TCI states for a CORESET (as indicated by reference numeral 825). After the configuration, the base station may indicate one of TCI states 830, 835, and 840 for the CORESET to the terminal through MAC CE signaling (as indicated by reference numeral 845). After the indication, the terminal receives a PDCCH, based on beam information included in a TCI state indicated by the MAC CE signaling.

Figure 9:
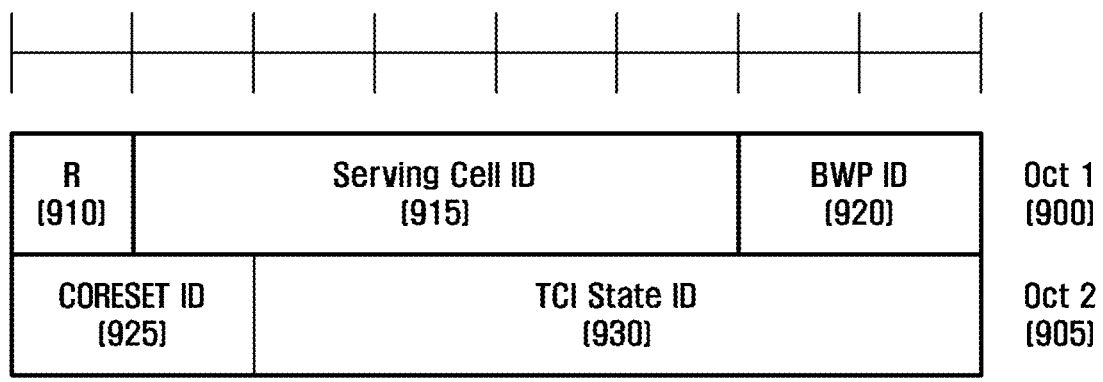
FIG. 9 illustrates a TCI indication MAC CE signaling structure for a PDCCH DMRS in 5G.

FIG. 9 illustrates a TCI indication MAC CE signaling structure for a PDCCH DMRS, as described above. Referring to FIG. 9, the TCI indication MAC CE signaling for a PDCCH DMRS is configured by 2 bytes (16 bits), and includes a reserved bit 910 formed of one bit, a serving cell ID 915 formed of five bits, a BWP ID 920 formed of two bits, a CORESET ID 925 formed of two bits, and a TCI state ID 930 formed of six bits.

Figure 10:
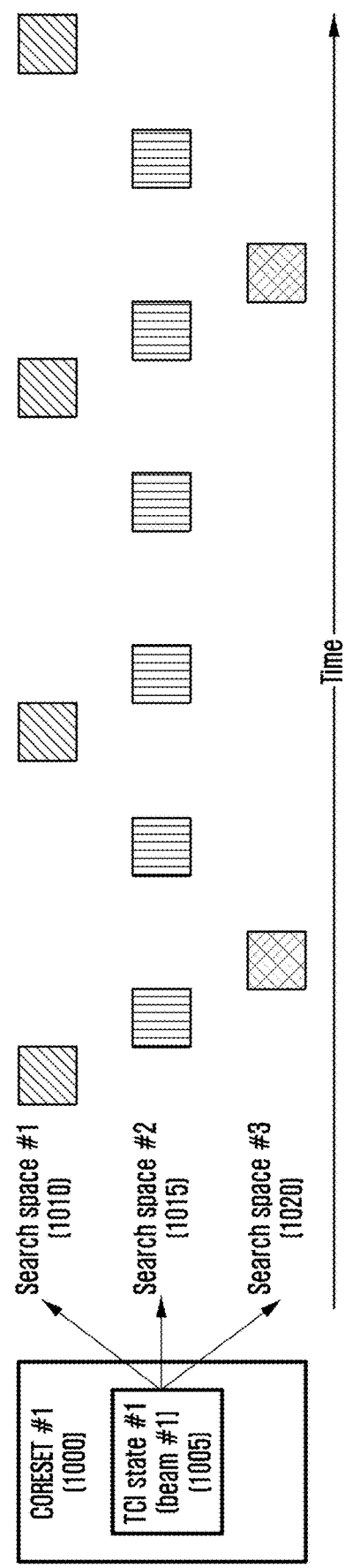
FIG. 10 illustrates an example of a beam configuration for a CORESET and a search space according to an embodiment.

FIG. 10 illustrates an example of configuration of a CORESET and a search space beam according to the above description. Referring to FIG. 10, a base station may indicate one TCI state in a TCI state list included in a configuration of a CORESET 1000 through MAC CE signaling (as indicated by reference numeral 1005). During a time interval from the indication to indication of another TCI state in the CORESET through another MAC CE signaling, a terminal may assume that the same QCL information (beam #1 1005) is applied to one or more search spaces 1010, 1015, and 1020 connected to the CORESET. In the described PDCCH beam allocation method, it is difficult to indicate a beam change earlier than an MAC CE signaling delay, and there is a shortage in that the same beam is collectively applied for each CORESET regardless of the characteristics of search spaces, so that flexible PDCCH beam management is difficult. Hereinafter, embodiments provide a more flexible PDCCH beam configuration and management method. In describing the embodiments below, for convenience of explanation, some distinguishable examples are provided, but the examples are not mutually exclusive, and can be properly combined with each other according to a situation for application.

A base station may configure, for a terminal, one or a plurality of TCI states with respect to a particular control resource set, and may activate one of the configured TCI states through an MAC CE activation command. For example, {TCI state #0, TCI state #1, TCI state #2} is configured for control resource set #1 as TCI states, and the base station may transmit a command of activating that a TCI state relating to control resource set #1 is assumed to be TCI state #0, through an MAC CE to the terminal. Based on the activation command relating to a TCI state, received through the MAC CE, the terminal may correctly receive a DMRS in the control resource set, based on QCL information in the activated TCI state.

With respect to a control resource set (control resource set #0) configured to have an index of 0, if the terminal has failed to receive an MAC CE activation command relating to a TCI state of control resource set #0, the terminal may assume that a DMRS transmitted in control resource set #0 is QCLed with an SS/PBCH block identified in an initial access process or a non-contention-based random access process that is not triggered by a PDCCH command.

With respect to a control resource set (control resource set #X) configured to have an index of a value rather than zero, if a TCI state relating to control resource set #X is failed to be configured for the terminal, or if one or more TCI states are configured for the terminal, but the terminal has failed to receive an MAC CE activation command of activating one of the TCI states, the terminal may assume that a DMRS transmitted in control resource set #X is QCLed with an SS/PBCH block identified in an initial access process.

Hereinafter, an embodiment will be described in detail with reference to the accompanying drawings. Although a 5G system will be described as an example of the following embodiments, embodiments can be applied to other communication systems having the similar technical backgrounds or channel form. For example, the communication systems may include LTE or LTE-A mobile communication, and mobile communication technology developed after 5G.

Therefore, an embodiment may be also applied to another communication system through partial modification without departing too far from the scope of the disclosure according to the determination of a person who skilled in the art.

In the following description of the disclosure, a detailed description of related functions or configurations incorporated herein will be omitted when it may make the subject matter of the disclosure rather unclear. The terms as described below are defined in consideration of the functions in the disclosure, and the meaning of the terms may vary according to the intention of a user or operator, convention, or the like. Therefore, the definitions of the terms should be made based on the contents throughout the specification.

Hereinafter, in describing the disclosure, higher layer signaling may be signaling corresponding to at least one of the signalings below or a combination of one or more thereof
MIB (Master Information Block).
SIB (System Information Block) or SIB X (X=1, 2, ... ).
RRC (Radio Resource Control).
MAC (Medium Access Control) CE (Control Element).
In addition, L1 signaling may be signaling corresponding to at least one of signaling methods using the physical layer channels or signalings below or a combination of one or more of the methods.
PDCCH (Physical Downlink Control Channel).
DCI (Downlink Control Information).
UE-specific DCI.
Group common DCI
Common DCI.
Scheduling DCI (e.g. DCI used for scheduling downlink or uplink data).
Non-scheduling DCI (e.g. DCI not for scheduling downlink or uplink data).
PUCCH (Physical Uplink Control Channel).
UCI (Uplink Control Information).

First Embodiment

For increasing a reception performance relating to a PDCCH, a base station may repeatedly transmit a PDCCH to a terminal, and the terminal may repeatedly receive a PDCCH transmitted from the base station.

A detailed description will be given with reference to FIG. 11A. FIG. 11A illustrates an example of repetitive transmission of a PDCCH according to the first embodiment.

FIG. 11A illustrates a control resource set 1110 which is a time and frequency resource region in which a PDCCH may be transmitted, and transmission of DCI 1120 in the control resource set 1110. FIG. 11A illustrates an example in which a PDCCH is repeatedly transmitted by a total of $N_{rep}$ 1100 (wherein, $N_{rep}$ may be an integer greater than or equal to 1). More specifically, the base station may repeatedly transmit, to the terminal, a DCI format by using $N_{rep}$ 1100 number of PDCCH monitoring occasions (or PDCCH transmission time point, wherein the PDCCH monitoring occasion may imply the position of a resource in which a PDCCH may be transmitted in the time or frequency domain). The terminal may receive the DCI format through a PDCCH repeatedly transmitted by $N_{rep}$ 1100 number through the $N_{rep}$ 1100 number of PDCCH monitoring occasions. The $N_{rep}$ 1100 number of PDCCH monitoring occasions, in which the PDCCH is repeatedly transmitted by $N_{rep}$ 1100 number, that is, the PDCCH monitoring occasions indicated by indices #1 1101, #2 1102, ... , and #$N_{rep}$ 1103 shown in FIG. 11A, may exist at particular time intervals $T_1$ 1130. In addition, a pattern including a set of the $N_{rep}$ 1100 number of PDCCH monitoring occasions may repeatedly exist at particular time intervals $T_2$ 1140.

(1-1)th Embodiment

The (1-1)th embodiment provides a method for determining the number ($N_{rep}$) of repetitive transmissions of a PDCCH.

In an embodiment, whether repetitive transmission of a PDCCH is performed may be configured for a terminal by a base station through higher layer signaling, L1 signaling, or a combination of higher layer signaling and L1 signaling.

In an embodiment, a terminal may receive the number ($N_{rep}$) of repetitive transmissions of a PDCCH from a base station through higher layer signaling, L1 signaling, or a combination of higher layer signaling and L1 signaling. For example, the base station may notify the terminal of a $N_{rep}$ value through higher layer signaling or L1 signaling. As another example, the base station may configure a set of one or a plurality of $N_{rep}$ values for the terminal through higher layer signaling (e.g. RRC signaling), and may activate one or some values in the configured $N_{rep}$ set through an MAC CE or L1 signaling.

In an embodiment, the terminal may receive a maximum value ($N_{max}$) of the number of repetitive transmissions of a PDCCH from the base station through higher layer signaling, L1 signaling, or a combination of higher layer signaling and L1 signaling. The terminal may expect the number of repetitive transmissions of a PDCCH, which is smaller than or equal to the configured $N_{max}$, that is $1 \leq N_{rep} \leq N_{max}$. For example, the base station may notify the terminal of a $N_{max}$ value through higher layer signaling or L1 signaling. As another example, the base station may configure a set of one or a plurality of $N_{max}$ values for the terminal through higher layer signaling (e.g. RRC signaling), and may activate one or some values in the configured $N_{max}$ set through an MAC CE or L1 signaling.

In an embodiment, the terminal may implicitly determine the number of repetitive transmissions of a PDCCH, based on another parameter configured for the terminal by the base station. For example, the number $N_{rep}$ of repetitive transmissions may be implicitly determined by the number of actually transmitted SSBs, and the number of TCI states configured in a control resource set.

In an embodiment, the terminal may implicitly determine the number of repetitive transmissions of a PDCCH, based on another parameter configured for the terminal by the base station. For example, the terminal may implicitly determine the number of repetitive transmissions of a PDCCH from a search space-related parameter value configured by the base station.

For example, the base station may configure a duration among parameters relating to a search space for the terminal, and the terminal may assume that PDCCHs transmitted in PDCCH monitoring occasions existing in an interval configured by the duration are repeatedly transmitted. A duration may correspond to configuration information as described below.

duration: Number of consecutive slots that a SearchSpace lasts in every occasion, i.e., upon every
period as given in the periodicityAndOffset. If the field is absent, the UE applies the value 1
slot, except for DCI format 2_0. The UE ignores this field for DCI format 2_0. The maximum
valid duration is periodicity-1 (periodicity as given in the monitoringSlotPeriodicityAndOffset).

If a duration that is a search space parameter is configured to be K, the terminal may assume that $N_{rep}$ is K. The terminal may monitor PDCCHs in each slot in a duration, and may assume that the PDCCHs transmitted in PDCCH occasions in the duration are repeatedly transmitted.

As yet another example, the base station may configure, for the terminal, pattern information (e.g. the information may correspond to a monitoringSymbolsWithinSlot among search space configuration parameters) relating to a monitoring occasion in a slot among parameters relating to a search space, and the terminal may assume that PDCCHs are repeatedly transmitted in PDCCH monitoring occasions in the configured slot. A monitoringSymbolsWithinSlot may correspond to configuration information as described below.

monitoringSymbolsWithinSlot: The first symbol(s) for PDCCH monitoring in the slots
configured for PDCCH monitoring (see monitoringSlotPeriodicityAndOffset and duration).
The most significant (left) bit represents the first OFDM in a slot, and the second most
significant (left) bit represents the second OFDM symbol in a slot and so on. The bit(s) set to
one identify the first OFDM symbol(s) of the control resource set within a slot. If the cyclic
prefix of the BWP is set to extended CP, the last two bits within the bit string shall be ignored
by the UE.
For DCI format 2_0, the first one symbol applies if the duration of CORESET (in the IE
ControlResourceSet) identified by controlResourceSetId indicates 3 symbols, the first two
symbols apply if the duration of CORESET identified by controlResourceSetId indicates 2
symbols, and the first three symbols apply if the duration of CORESET identified by
controlResourceSetId indicates 1 symbol. See TS 38.213 [13], clause 10.

If the number of PDCCH monitoring occasions in a slot is configured to be a total of K by a monitoringSymbolsWithinSlot that is a search space parameter, the terminal may assume that $N_{rep}$ is K. The terminal may monitor a PDCCH in the position of a symbol designated by a monitoringSymbolsWithinSlot in slot, and may assume that PDCCHs transmitted in PDCCH occasions in the slot are repeatedly transmitted.

As yet another example, the terminal may assume that PDCCHs transmitted in PDCCH monitoring occasions monitored in a DRX inactive time are repeatedly transmitted. The terminal may monitor a PDCCH in a DRX inactive time with respect to a search space in which a particular DCI format (e.g. a DCI format scrambled by an SI/P/RA-RNTI or a DCI format scrambled by an RNTI (e.g. PS-RNTI) for power saving) is configured to be monitored. The number of PDCCH monitoring occasions of the search space in a time region corresponding to the DRX inactive time may be K, and the terminal may receive a PDCCH under the assumption that $N_{rep}$ is K.

In an embodiment, a terminal may receive the number ($N_{rep}$) of repetitive transmissions of a PDCCH from a base station through higher layer signaling, L1 signaling, or a combination of higher layer signaling and L1 signaling. For example, the base station may notify the terminal of a $N_{rep}$ value through higher layer signaling or L1 signaling. As another example, the base station may configure a set of one or a plurality of $N_{rep}$ values for the terminal through higher layer signaling (e.g. RRC signaling), and may activate one or some values in the configured $N_{rep}$ set through an MAC CE or L1 signaling. In addition, the terminal may receive search space configuration information based on the number ($N_{rep}$) of repetitive transmissions, received from the base station. For example, if the terminal receives the number ($N_{rep}$) of repetitive transmissions of a PDCCH from the base station, the terminal may receive, as $N_{rep}$, a value relating to a duration in configuration information relating to a search space from the base station, and may assume that PDCCHs transmitted in PDCCH occasions in the duration are repeatedly transmitted. As yet another example, if the terminal receives the number ($N_{rep}$) of repetitive transmissions of a PDCCH from the base station, the terminal may receive a monitoringSymbolsWithinSlot parameter value allowing the total number of PDCCH monitoring occasions in a slot to be $N_{rep}$ in configuration information relating to a search space from the base station, and may assume that PDCCHs transmitted in the PDCCH occasions in the slot are repeatedly transmitted.

Some embodiments among the described embodiments may be always applied to a situation in which a terminal monitors a PDCCH, or may be limitedly applied to the situations as below.

A terminal monitors a PDCCH in a DRX active time.
A terminal monitors a PDCCH in a DRX inactive time.
A terminal monitors a particular search space (e.g. monitoring of a common search space or monitoring of a UE-specific search space).
A terminal monitors a particular DCI format (e.g. monitoring of scheduling DCI, monitoring of non-scheduling DCI, or monitoring of a DCI format defined for power saving (PS)).
A terminal monitors DCI scrambled by a particular RNTI (e.g. a terminal monitors DCI scrambled by an RNTI (e.g. PS-RNTI) defined for power saving, or a terminal monitors DCI scrambled by at least one of the described RNTIs (e.g. C-RNTI, RA-RNTI, or P-RNTI).

(1-2)th Embodiment

The (1-2)th embodiment proposes a method for, if a PDCCH is configured to be repeatedly transmitted, determining a monitoring occasion of the PDCCH repeatedly transmitted.

In an embodiment, a base station may configure, for a terminal, information (e.g. the information may correspond to a starting symbol index, a slot index, a subframe index, and a frame index relating to repetitive transmission of a PDCCH, and the indices will be collectively denoted by $N_{start}$) relating to an initial time point at which repetitive transmission of a PDCCH starts, through higher layer signaling. The terminal may assume that repetitive transmission of a PDCCH starts from a time point of an $N_{start}$ received from the base station. For example, if the terminal receives the number ($N_{rep}$) of repetitive transmissions and a repetitive transmission start time point index ($N_{start}$) relating to a PDCCH from the base station, the terminal may assume that the PDCCH is repeatedly transmitted in $N_{rep}$ number of consecutive PDCCH monitoring occasions from a PDCCH monitoring occasion corresponding to the time point of $N_{start}$.

In an embodiment, a PDCCH may be repeatedly transmitted in $N_{rep}$ number of consecutive PDCCH monitoring occasions in one search space set. That is, in FIG. 11A, all of indices #1 1101, #2 1102, . . . , and #$N_{rep}$ 1103 may correspond to consecutive PDCCH monitoring occasions in one search space set configuration. For example, indices #1 1101, #2 1102, . . . , and #$N_{rep}$ 1103 may correspond to consecutive PDCCH monitoring occasions expressed in the units of slots in one search space set (e.g. PDCCH monitoring occasions determined by an RRC parameter monitoringSlotPeriodicityAndOffset). As another example, indices #1 1101, #2 1102, . . . , and #$N_{rep}$ 1103 may correspond to consecutive PDCCH monitoring occasions expressed in the units of symbols in a slot in one search space set (e.g. a symbol-unit pattern relating to PDCCH monitoring occasions in a slot, determined by an RRC parameter monitoringSymbolsWithinSlot). As another example, indices #1 1101, #2 1102, . . . , and #$N_{rep}$ 1103 may correspond to consecutive PDCCH monitoring occasions having an interval equal to or larger than a particular time interval ($T_1$ 1130) in one search space set. As another example, if the base station configures, for the terminal, P as a slot-unit period of a search space set and $N_{rep}$ as the number of repetitive transmissions of a PDCCH, the terminal may assume that a pattern including $N_{rep}$ number of PDCCH monitoring occasions repeatedly occurs at each period P with respect to the search space set. More specifically, referring to FIG. 11A, the terminal may assume that a total of $N_{rep}$ number of PDCCH monitoring occasions (indices #1 1101, #2 1102, . . . , and #$N_{rep}$ 1103) having an interval of $T_1$ 1130 repeatedly occurs at period P of $T_2$ 1140 ($T_2$ 1140=P). $N_{rep}$ number of PDCCH monitoring occasions may appear at each consecutive slot unit (e.g. $T_1$ 1130 corresponds to a slot-unit time interval), may appear at each consecutive symbol unit (e.g. $T_1$ 1130 corresponds to a symbol-unit time interval), may appear at each symbol length (duration) unit of a control resource set in which a corresponding search space set is monitored (e.g. $T_1$ 1130 corresponds to the symbol length of a control resource set), or may appear at each random time unit configured from the base station. Based on the described methods, the terminal may identify $N_{rep}$ number of PDCCH monitoring occasions in which a PDCCH is repeatedly transmitted.

In an embodiment, a PDCCH may be repeatedly transmitted in $N_{rep}$ number of consecutive PDCCH monitoring occasions determined in a plurality of search space sets configured for the terminal. That is, in FIG. 11A, indices #1 1101, #2 1102, . . . , and #$N_{rep}$ 1103 may correspond to PDCCH monitoring occasions in different search space sets. For example, as illustrated in FIG. 11A, index #1 1101 corresponds to a PDCCH monitoring occasion of search space set #1 1150, index #2 1102 corresponds to a PDCCH monitoring occasion of search space set #2 1151, . . . . Therefore, indices #1 1101, #2 1102, . . . , and #$N_{rep}$ 1103 may correspond to $N_{rep}$ number of consecutive PDCCH monitoring occasions determined from different search space sets. As a method for determining $N_{rep}$ number of PDCCH monitoring occasions in which a PDCCH is repeatedly transmitted, from PDCCH monitoring occasions of different search space sets, a method for assigning an index to PDCCH monitoring occasions may be considered.

For example, an index may be sequentially assigned to PDCCH monitoring occasions that do not overlap with each other in the time axis, among PDCCH monitoring occasions determined from different search space sets. PDCCH monitoring occasions overlapping with each other in the time axis may imply that at least one symbol overlaps in the time axis with respect to different PDCCH monitoring occasions, or all symbols overlap in the time axis with respect to different PDCCH monitoring occasions. For example, in FIG. 11A, if search space set #1 1150 and search space set #3 1152 are configured for the terminal, first PDCCH monitoring occasions of search space set #1 1150 and search space set #3 1152 overlap with each other in the time axis, and thus one index #1 1101 may be assigned.

In an example of a method for assigning one index to different PDCCH monitoring occasions overlapping in the time axis, only one PDCCH monitoring occasion may be selected among different PDCCH monitoring occasions overlapping in the time axis, and an index may be assigned to the one PDCCH monitoring occasion. For example, a PDCCH monitoring occasion of a search space set having the lowest (or highest) search space index may be selected among the different PDCCH monitoring occasions overlapping in the time axis, and an index may be assigned to the selected PDCCH monitoring occasion.

In another example of a method for assigning one index to different PDCCH monitoring occasions overlapping in the time axis, one index may be assigned to all different PDCCH monitoring occasions overlapping in the time axis. One index may be assigned to all the different PDCCH monitoring occasions overlapping in the time axis, and the terminal may assume that one piece of DCI is to be transmitted in the PDCCH monitoring occasions to which the same index has been assigned.

A second PDCCH monitoring occasion of search space set #3 1152 does not overlap with a PDCCH monitoring occasion of other search space sets in the time axis. Therefore, a next index #2 1102 may be assigned to the second PDCCH monitoring occasion. The terminal may identify PDCCH monitoring occasions that do not overlap in the time axis and are configured by a plurality of configured search space sets, and may determine an index of each of the PDCCH monitoring occasions accordingly. Through a criterion of determining whether PDCCH monitoring occasions overlap with each other in the time axis in different search space sets, overlapping may be determined, for example, if at least one symbol overlaps in a corresponding PDCCH monitoring occasion, or if all symbols overlap in a corresponding PDCCH monitoring occasion. The terminal may determine a total of $N_{rep}$ number of PDCCH monitoring occasions to have indices starting from an index of a first PDCCH monitoring occasion existing at a time point of $N_{start}$ received from the base station in an order in which the index increases.

As another example, an index may be sequentially assigned in consideration of all PDCCH monitoring occasions overlapping or not overlapping in the time axis, among PDCCH monitoring occasions determined from different search space sets. For example, in FIG. 11A, in a case where search space set #1 1150 and search space set #3 1152 are configured for the terminal, if the first PDCCH monitoring occasions of search space set #1 1150 and search space set #3 1152 overlap with each other in the time axis, an index may be assigned to each of the PDCCH monitoring occasions of the search space sets. In a method for assigning an index to overlapping PDCCH monitoring occasions, an index may be sequentially assigned in an order from the lowest (highest) search space index, or in an order from the lowest (highest) index of a control resource set in which a corresponding search space set is monitored. For example, index #1 may be assigned to the first PDCCH monitoring occasion of search space set #1 1150 having a relatively low search space index, and index #2 may be assigned to the first PDCCH monitoring occasion of search space set #3 1152 having a second lowest search space index. Index #3 may be assigned to the second PDCCH monitoring occasion of search space set #3 1152, corresponding to a next PDCCH monitoring occasion in the time axis. The terminal may identify PDCCH monitoring occasions configured by a plurality of configured search space sets, and may determine an index of each of the PDCCH monitoring occasions accordingly. The terminal may determine a total of $N_{rep}$ number of PDCCH monitoring occasions to have indices starting from an index of a first PDCCH monitoring occasion existing at a time point of $N_{start}$ received from the base station in an order in which the index increases.

In an embodiment, a PDCCH may be repeatedly transmitted in $N_{rep}$ number of consecutive PDCCH monitoring occasions in one or a plurality of search space sets configured to be monitored in the same control resource set (or associated with the same control resource set or configured to have the same control resource set index in a search space configuration). That is, in FIG. 11A, all of indices #1 1101, #2 1102, ..., and #$N_{rep}$ 1103 may correspond to consecutive PDCCH monitoring occasions in a search space set(s) configured to be monitored in the same control resource set.

In an embodiment, a PDCCH may be repeatedly transmitted in $N_{rep}$ number of consecutive PDCCH monitoring occasions in one or a plurality of search space sets configured to be monitored in different control resource sets (or associated with different control resource sets or configured to have different control resource set indices in a search space configuration). That is, in FIG. 11A, all of indices #1 1101, #2 1102, ..., and #$N_{rep}$ 1103 may correspond to consecutive PDCCH monitoring occasions in a search space set(s) configured to be monitored in different control resource sets.

A base station may configure whether repetitive transmission of a PDCCH is performed for each search space set for a terminal. For example, the base station may notify, through higher layer signaling, the terminal of additional configuration information including whether repetitive transmission is performed, the number of repetitive transmissions, and a repetitive transmission start time point with respect to a search space to which repetitive transmission is to be applied. Alternatively, the base station may refer the terminal to the index (indices) of one or a plurality of search space sets as a part of configuration parameters relating to repetitive transmission of a PDCCH. The terminal may apply the repetitive transmission relating to a PDCCH, received from the base station, to a corresponding search space set associated with (i.e. referred to by a search space set index) a corresponding repetitive transmission configuration parameter. Alternatively, the base station may refer the terminal to the index (indices) of one or a plurality of control resource sets as a part of configuration parameters relating to repetitive transmission of a PDCCH. The terminal may apply the repetitive transmission relating to a PDCCH, received from the base station, to search space sets associated with a control resource set associated with (i.e. referred to by a control resource set index) a corresponding repetitive transmission configuration parameter.

Some embodiments among the described embodiments may be always applied to a situation in which a terminal monitors a PDCCH or may be limitedly applied to the situations as below.

A terminal monitors a PDCCH in a DRX active time.
A terminal monitors a PDCCH in a DRX inactive time.
A terminal monitors a particular search space (e.g. monitoring of a common search space or monitoring of a UE-specific search space).
A terminal monitors a particular DCI format (e.g. monitoring of scheduling DCI, monitoring of non-scheduling DCI, or monitoring of a DCI format defined for power saving (PS)).
A terminal monitors DCI scrambled by a particular RNTI (e.g. a terminal monitors DCI scrambled by an RNTI (e.g. PS-RNTI) defined for power saving, or at least one of the described RNTIs).

(1-3)th Embodiment

The (1-3)th embodiment proposes a method for, if a PDCCH is configured to be repeatedly transmitted, determining a time interval ($T_1$ 1130) between monitoring occasions for the PDCCH repeatedly transmitted.

If a terminal receives a repetitive transmission start time point ($N_{start}$) relating to a PDCCH, the number ($N_{rep}$ 1100) of repetitive transmissions of a PDCCH, and an interval ($T_1$ 1130) value between monitoring occasions for a PDCCH repeatedly transmitted, the terminal may assume that a PDCCH is repeatedly transmitted in a total of $N_{rep}$ 1100 number of PDCCH monitoring occasions having an interval of $T_1$ 1130 from a first PDCCH monitoring occasion existing at a time point of $N_{start}$.

In an embodiment, $T_1$ 1130 may be previously defined as a system parameter. For example, $T_1$ 1130 may correspond to the unit of a symbol (e.g. X symbol (X≥1)), may correspond to the unit of a slot (e.g. Y slot (Y≥1)), may correspond to the unit of a ms (e.g. Z ms (Z>0)), or may correspond to the symbol length of a control resource set in which a PDCCH is repeatedly transmitted.

In an embodiment, the base station may configure the value of $T_1$ 1130 for the terminal through higher layer signaling. If the terminal receives a value of $T_1$ 1130 from the base station through higher layer signaling, the terminal may assume that a PDCCH is repeatedly transmitted in a total of $N_{rep}$ 1100 number of PDCCH monitoring occasions having the interval of $T_1$ 1130 from a first PDCCH monitoring occasion existing at a time point of $N_{start}$. If the terminal has not received a value of $T_1$ 1130 from the base station through higher layer signaling, the terminal may apply a default value predefined for $T_1$ 1130. A default value of $T_1$ 1130 may be, for example, X symbols (X=1, 2, 3, 4, 5, 6, or 7), one slot, or the symbol length of a control resource set in which a PDCCH is repeatedly transmitted.

In an embodiment, the terminal may implicitly determine $T_1$ 1130 from another system parameter (e.g. a part of configuration information relating to a control resource set or a search space) received from the base station. In an example, $T_1$ 1130 may correspond to the symbol length of a control resource set configured for repetitive transmission of a PDCCH. As another example, $T_1$ 1130 may correspond to an interval between PDCCH monitoring occasions (these may correspond to PDCCH monitoring occasions which may be determined by a monitoringSymbolsWithinSlot that is a search space parameter) expressed in the units of symbols in a slot in which a PDCCH is repeatedly transmitted. As another example, $T_1$ 1130 may correspond to a monitoring period (a monitoring period expressed in the units of slots, which may be determined by a monitoringSlotPeriodicityAndOffset that is a search space parameter) expressed in the units of slots for a search space in which a PDCCH is repeatedly transmitted.

In an embodiment, $T_1$ 1130 may have different sizes for each of PDCCH occasions in which a PDCCH is repeatedly transmitted. $T_1$ 1130 may have the same size for PDCCH occasions in which a PDCCH is repeatedly transmitted.

(1-4)th Embodiment

The (1-4)th embodiment proposes a method for, if a PDCCH is configured to be repeatedly transmitted, determining a period ($T_2$ 1140) at which $N_{rep}$ number of PDCCH repetitive transmission are repeated.

If a terminal receives a repetitive transmission start time point ($N_{start}$) relating to a PDCCH, the number ($N_{rep}$ 1100) of repetitive transmissions of a PDCCH, an interval ($T_1$ 1130) between monitoring occasions for a PDCCH repeatedly transmitted, and a transmission period ($T_2$ 1140), the terminal may assume that a PDCCH is repeatedly transmitted in a total of $N_{rep}$ 1100 number of PDCCH monitoring occasions having an interval of $T_1$ 1130, starting from a first PDCCH monitoring occasion existing at a time point of $N_{start}$, and $N_{rep}$ 1100 number of PDCCH repetitive transmission are repeated at time intervals of $T_2$ 1140.

In an embodiment, $T_2$ 1140 may be previously defined as a system parameter. For example, T2 1140 may correspond to the unit of a slot (e.g. Y slot (Y≥1)), may correspond to the unit of a ms (e.g. Z ms (Z>0)), or may correspond to a period at which a SS/PBCH block is transmitted.

In an embodiment, a base station may configure the value of $T_2$ 1140 for the terminal through higher layer signaling.

In an embodiment, the terminal may determine $T_2$ 1140 to be a combination of $N_{rep}$ 1100 configured by the base station and a configuration value (G) additionally received through higher layer signaling. For example, $T_2$ 1140 may be expressed by a function of $N_{rep}$ and G, that is, $f(N_{rep}, G)$. For example, $T_2$ may be determined to be $N_{rep} \cdot G$ ($T_2 = N_{rep} \cdot G$).

In an embodiment, the terminal may implicitly identify the value of $T_2$ 1140 from configuration information relating to a search space, received from the base station. For example, the value of $T_2$ 1140 may be identical to the value of a configuration (e.g. this may correspond to a monitoringSlotPeriodicityAndOffset that is an RRC parameter relating to a search space) relating to a monitoring period expressed in the units of slots among search space configuration parameters. For example, the base station may configure, for the terminal, a monitoring period expressed in the units of slots to be a P-slot as a configuration parameter relating to a particular search space, and the terminal may assume that $T_2$ 1140 is a P-slot, if a PDCCH is repeatedly transmitted with respect to a corresponding search space set. As another example, the value of $T_2$ 1140 may be defined to be a function between a configuration value relating to a monitoring period expressed in the units of slots and a value of $N_{rep}$ 1100 that is the number of repetitive transmissions of a PDCCH among search space configuration parameters, that is f (a slot-unit monitoring period, the number of repetitive transmissions). For example, function f (a slot-unit monitoring period, the number of repetitive transmissions) may be defined by multiplying of a slot-unit monitoring period by the number of repetitive transmissions. For example, the base station may configure, for the terminal, a monitoring period expressed in the units of slots to be a P-slot as a configuration parameter relating to a particular search space, and the terminal may assume that $T_2$(1140)= P× an $N_{rep}$ slot, if a PDCCH is repeatedly transmitted with respect to a corresponding search space set.

Figure 11B:
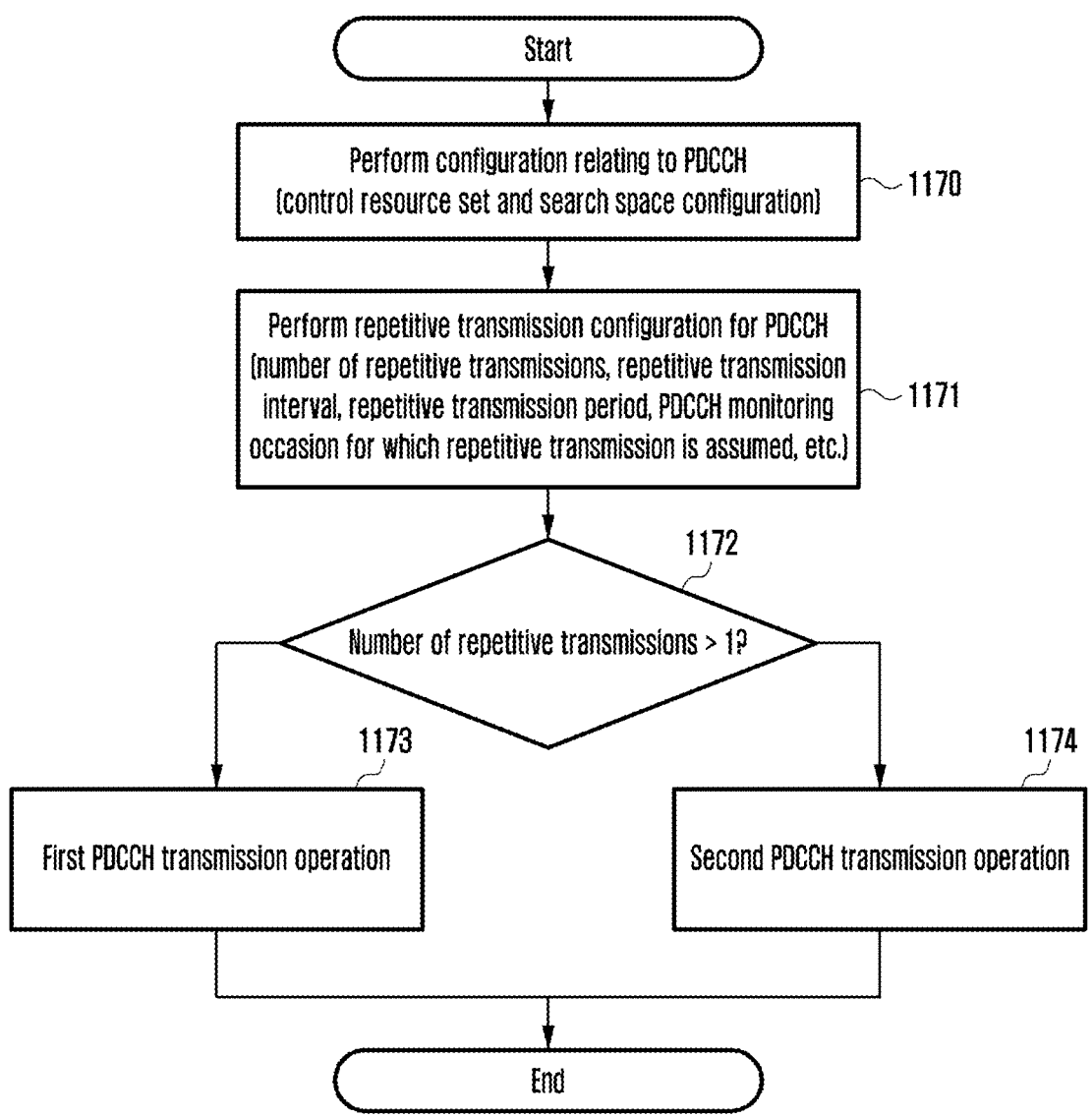
FIG. 11B illustrates a flow chart of an example of an operation of a base station according to the first embodiment.

FIG. 11B illustrates a flow chart of an example of an operation of a base station according to the first embodiment. In FIG. 11B, a base station may perform an operation of the first embodiment described with reference to FIG. 11A. In FIG. 11B, a description overlapping with the description given with reference to FIGS. 1 to 11A is omitted.

Referring to FIG. 11B, a base station may perform a configuration relating to a PDCCH (operation 1170). In an embodiment, the configuration (a first configuration) relating to a PDCCH may include a configuration (control resource set configuration) relating to a control resource set for a PDCCH and/or a configuration (search space configuration) relating to a search space(s) for a PDCCH. The control resource set configuration and the search space configuration are as described with reference to FIGS. 1 to 11A. For example, the base station may perform a configuration relating to a control resource set and a search space(s) for a PDCCH. The configuration relating to a control resource set for a PDCCH is, for example, as described with reference to FIG. 4 and Table 9, and the configuration relating to a search space(s) is, for example, as described with reference to FIG. 5 and Table 10.

The base station may perform a repetitive transmission configuration for a PDCCH (operation 1171). In an embodiment, the repetitive transmission configuration (a second configuration) relating to a PDCCH may include a configuration (configuration of whether repetitive transmission is performed) relating to whether repetitive transmission of a PDCCH is performed, a configuration (repetitive transmission number configuration) relating to the number of repetitive transmissions, information (PDCCH monitoring occasion information) relating to a PDCCH monitoring occasion for which repetitive transmission is assumed, a configuration (repetitive transmission interval configuration) relating to a repetitive transmission interval, and/or a configuration (repetitive transmission period configuration) relating to a repetitive transmission period. The configurations are as described in the first embodiment with reference to FIG. 11A, for example, the configuration of whether repetitive transmission is performed and the repetitive transmission number configuration are as described in the (1-1)th embodiment, the PDCCH monitoring occasion information is as described in the (1-2) embodiment, the repetitive transmission interval configuration is as described in the (1-3) embodiment, and the repetitive transmission period configuration is as described in the (1-4) embodiment.

The base station may determine whether the number of repetitive transmissions of a PDCCH is larger than 1 (operation 1172). For example, the base station may determine whether the number of repetitive transmissions of a PDCCH is larger than 1, based on the repetitive transmission configuration relating to a PDCCH.

If the number of repetitive transmissions is larger than 1, the base station may perform a first PDCCH transmission operation (operation 1173). For example, if repetitive transmission is configured, and the number of repetitive transmissions is larger than 1, the base station may perform a repetitive transmission operation of a PDCCH. The repetitive transmission operation of a PDCCH of the base station is as described with reference to FIG. 11A.

Otherwise, if the number of repetitive transmissions is not larger than 1, the base station may perform a second PDCCH transmission operation (operation 1174). For example, if repetitive transmission is configured, but the number of repetitive transmissions is not larger than 1 (e.g. the number of repetitive transmissions is 1), the base station may not perform a repetitive transmission operation of a PDCCH as illustrated in FIG. 11A, and may perform a general (legacy) transmission operation of a PDCCH.

According to an embodiment, if the base station has performed a repetitive transmission configuration relating to a PDCCH, the base station may directly perform a repetitive transmission operation without performing a process of determining whether the number of repetitive transmissions is larger than 1 in operation 1172 described above. That is, if a repetitive transmission configuration is performed, the base station may omit a process of determining whether the number of repetitive transmissions is larger than 1, and may directly perform a repetitive transmission operation. For example, the base station may configure the number of repetitive transmissions to be only a value equal to or larger than 2 when repetitive transmission is configured, and the base station may omit operation 1172 in FIG. 11B, and may directly perform the first PDCCH transmission operation (repetitive transmission operation).

Figure 11C:
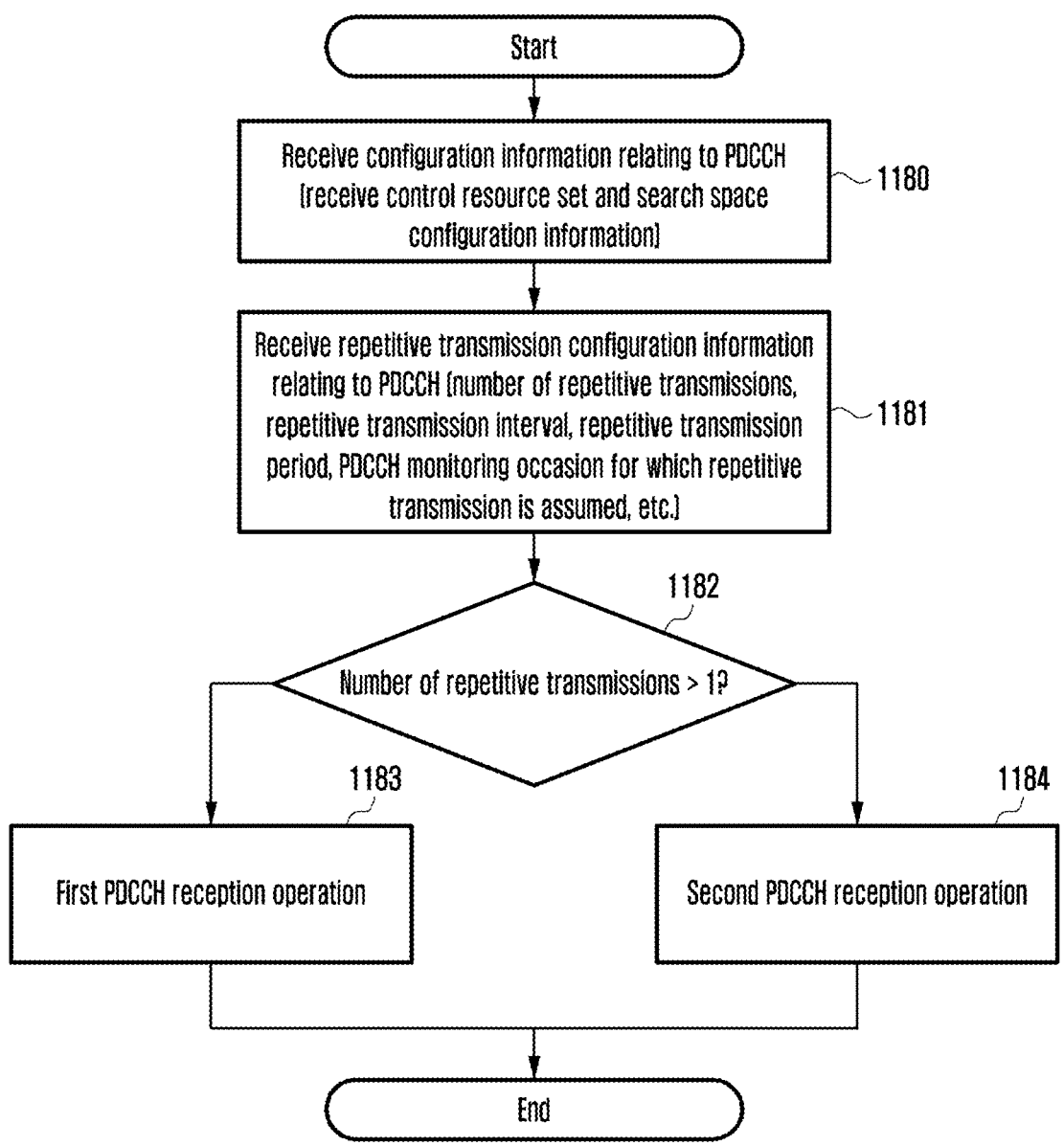
FIG. 11C illustrates a flow chart of an example of an operation of a terminal according to the first embodiment.

FIG. 11C illustrates a flow chart of an example of an operation of a terminal according to the first embodiment. In FIG. 11C, a terminal may perform an operation of the first embodiment described with reference to FIG. 11A. In FIG. 11C, a description overlapping with the description given with reference to FIGS. 1 to 11B is omitted.

Referring to FIG. 11C, a terminal may receive configuration information (first configuration information) relating to a PDCCH from a base station (operation 1180). In an embodiment, the configuration information relating to a PDCCH may include configuration information (control resource set configuration information) relating to a control resource set and configuration information (search space configuration information) relating to a search space(s). The control resource set configuration information relating to a PDCCH is, for example, as described with reference to FIG. 4 and Table 9, and the search space configuration information is, for example, as described with reference to FIG. 5 and Table 10.

The terminal may receive repetitive transmission configuration information (second configuration information) relating to a PDCCH from the base station (operation 1171). For example, the repetitive transmission configuration information may include information (repetitive transmission information) relating to whether repetitive transmission of a PDCCH is performed, information (repetitive transmission number information) relating to the number of repetitive transmissions, information (repetitive transmission interval information) relating to a repetitive transmission interval, information (repetitive transmission period information) relating to a repetitive transmission period, and/or information (PDCCH monitoring occasion information) relating to a PDCCH monitoring occasion for which repetitive transmission is assumed. The pieces of configuration information are as described in the first embodiment with reference to FIG. 11A, for example, the repetitive transmission number information and the repetitive transmission number information are as described in the (1-1)th embodiment, the PDCCH monitoring occasion information is as described in the (1-2) embodiment, the repetitive transmission interval information is as described in the (1-3) embodiment, and the repetitive transmission period information is as described in the (1-4) embodiment.

The terminal may determine whether the number of repetitive transmissions of a PDCCH is larger than 1 (operation 1182). For example, the terminal may determine whether the number of repetitive transmissions of a PDCCH is larger than 1, based on the repetitive transmission configuration information relating to a PDCCH.

If the number of repetitive transmissions is larger than 1, the terminal may perform a first PDCCH reception operation (operation 1183). For example, if the number of repetitive transmissions provided by repetitive transmission number information is larger than 1, the terminal may perform a repetitive transmission operation of a PDCCH. The repetitive reception operation of a PDCCH of the terminal is as described with reference to FIG. 11A.

Otherwise, if the number of repetitive transmissions is not larger than 1, the terminal may perform a second PDCCH reception operation (operation 1184). For example, if the number of repetitive transmissions provided by repetitive transmission number information is not larger than 1 (e.g. the number is 1), the terminal may not perform a repetitive reception operation of a PDCCH as illustrated in FIG. 11A, and may perform a general (legacy) reception operation of a PDCCH.

According to an embodiment, if the terminal has received repetitive transmission configuration information, the terminal may directly perform a repetitive reception operation without performing a process of determining whether the number of repetitive transmissions is larger than 1 in operation 1181 described above. That is, if repetitive transmission configuration information is received, the terminal may omit a process of determining whether the number of repetitive transmissions is larger than 1, and may directly perform a repetitive reception operation. For example, the base station may configure the number of repetitive transmissions to be only a value equal to or larger than 2 when repetitive transmission is configured, and the terminal that received the repetitive transmission configuration information may omit operation 1182 in FIG. 11C, and may directly perform the first PDCCH reception operation (repetitive reception operation).

Second Embodiment

For increasing a reception performance relating to a PDCCH, a base station may transmit a PDCCH in PDCCH monitoring occasions, in which the PDCCH may be transmitted, to a terminal by using different beams, and the terminal may perform a reception operation relating to the PDCCH under the assumption of different beams in PDCCH monitoring occasions. As described above, an operation in which a base station and a terminal transmit or receive a PDCCH under the assumption of different beams in different PDCCH monitoring occasions, that is, TCI states, is named multi-beam-based PDCCH transmission in the disclosure.

In an embodiment, PDCCH monitoring occasions in which different beams may be applied for transmission or reception described above may be determined based on a search space-related configuration configured for the terminal by the base station.

In an embodiment, PDCCH monitoring occasions in which different beams may be applied for transmission or reception described above may correspond to a set of PDCCH monitoring occasions in which a PDCCH is repeated transmitted, described in the first embodiment.

Figure 12A:
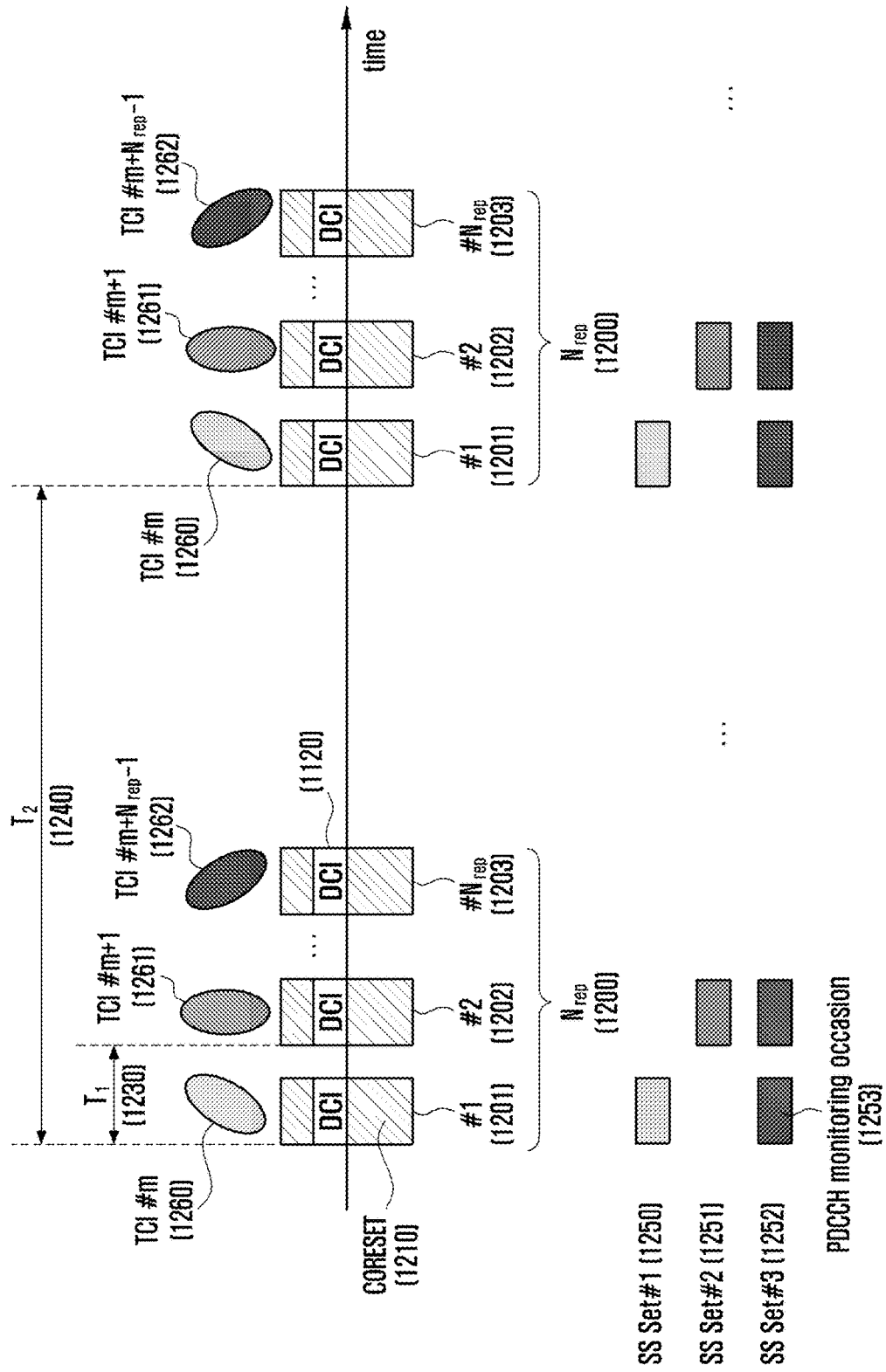
FIG. 12A illustrates an example of a multi-beam transmission method for a PDCCH according to an embodiment.

A detailed description will be given with reference to FIG. 12A. FIG. 12A illustrates an example of repetitive transmission of a PDCCH according to the first embodiment and an example of multi-beam transmission of a PDCCH according to the second embodiment.

FIG. 12A illustrates a control resource set 1210 which is a time and frequency resource region in which a PDCCH may be transmitted, and transmission of DCI 1220 in the control resource set 1210. FIG. 12A illustrates an example in which a PDCCH is repeatedly transmitted by a total of $N_{rep}$ 1200 (wherein, $N_{rep}$ may be an integer greater than or equal to 1). In addition, FIG. 12A illustrates an example in which a PDCCH is transmitted in PDCCH monitoring occasions, in which the PDCCH is repeated transmitted, by using different beams (or the assumption of different TCI states, or different QCL types D).

The base station may repeatedly transmit a DCI format to the terminal in $N_{rep}$ 1200 number of PDCCH monitoring occasions (or PDCCH transmission time points, wherein the PDCCH monitoring occasions may imply the position of a resource in which a PDCCH may be transmitted in the time or frequency domain). The base station may transmit a PDCCH to the terminal in $N_{rep}$ 1200 number of PDCCH monitoring occasions, in which the PDCCH may be repeated transmitted, at different TCI states (TCI #m 1260, TCI #m+1 1261, . . . , and TCI #m+$N_{rep}$−1 1262 in an example in FIG. 12A) The terminal may receive the DCI format through a PDCCH repeatedly transmitted by $N_{rep}$ number 1200 through the $N_{rep}$ number 1200 of PDCCH monitoring occasions. The $N_{rep}$ 1200 number of PDCCH monitoring occasions, in which the PDCCH is repeatedly transmitted by $N_{rep}$ 1200 number, that is, the PDCCH monitoring occasions indicated by indices #1 1201, #2 1202, . . . , and #$N_{rep}$ 1203 shown in FIG. 12A, may exist at particular time intervals $T_1$ 1230. In addition, a pattern including a set of the Nrep 1200 number of PDCCH monitoring occasions may repeatedly exist at particular time intervals $T_2$ 1240. In addition, the terminal may assume different TCI states (TCI #m 1260, TCI #m+1 1261, . . . , and TCI #m+$N_{rep}$−1 1262 in an example in FIG. 12A) and receive a PDCCH in the $N_{rep}$ 1200 number of PDCCH monitoring occasions, that is, the PDCCH monitoring occasions indicated by indices #1 1201, #2 1202, . . . , and #$N_{rep}$ 1203 shown in FIG. 12A.

(2-1)th Embodiment

A base station may configure, for a terminal, one or a plurality of TCI states with respect to one control resource set, and may activate one of the configured TCI states through an MAC CE activation command. For example, the base station may configure M number of TCI states, that is {TCI #0, TCI #1, TCI #2, . . . , TCI #(M−1)}, for a random control resource set #X for the terminal through higher layer signaling, and may transmit, to the terminal, a command of activating one of the M number of TCI states configured through MAC CE signaling, for example, TCI #m (0≤m<M). Based on the activation command relating to a TCI state, received through the MAC CE, the terminal may correctly receive a DMRS in the control resource set, based on QCL information in the activated TCI state.

The (2-1)th embodiment proposes a method for, with respect to a control resource set in which a TCI state is configured and activated, determining a TCT state in each PDCCH monitoring occasion of a search space monitored in the control resource set. More specifically, for example, the terminal may receive a PDCCH under the assumption of a total of M number of TCI states for N number of PDCCH monitoring occasions. In addition, N number of PDCCH monitoring occasions to which multi-beam-based transmission described above may be applied may correspond to PDCCH monitoring occasions of one or a plurality of search space sets configured to be monitored in the same control resource set, or PDCCH monitoring occasions of one or a plurality of search space sets configured to be monitored in different control resource sets.

In an embodiment, the base station may configure the number (N) of PDCCH monitoring occasions, to which different TCI states are to be applied, through higher layer signaling for the terminal. Alternatively, the terminal may receive configuration information indicating whether multi-beam-based transmission of a PDCCH is performed, through higher layer signaling from the base station, and PDCCH monitoring occasions, to which different TCI states are to be applied, may be implicitly determined based on other system parameters (e.g. a PDCCH-related configuration, a control resource set-related configuration, a search space-related configuration, or a DRX-related configuration) configured in the terminal.

In an embodiment, the terminal may receive an MAC CE instruction of activating one of one or a plurality of TCI states configured in a control resource set from the base station. For example, M number of TCI states {TCI #0, TCI #1, . . . , TCI #(M−1)} may be configured for the terminal with respect to a control resource set, and the terminal may receive an MAC CE instruction of activating a particular state of TCI #m (0≤m<M) among the M number of TCI states. The terminal may sequentially apply a TCI state to N number of preconfigured PDCCH monitoring occasions, starting from a first PDCCH monitoring occasion to TCI #m activated by the MAC CE, in an order that the TCI state index increase (or decrease) in a TCI state set {TCI #0, TCI #1, . . . , and TCI #(M−1)} configured through higher layer signaling, so as to monitor a PDCCH in each of the PDCCH monitoring occasions. For example, in FIG. 12A, with respect to N (=$N_{rep}$) number of PDCCH occasions {#1 (1201), #2(1202), . . . , #$N_{rep}$(1203))}, the terminal may assume TCI #m 1260 for index #1 1201, may assume TCI #(mod(m+1,M)) 1261 for index #2 1202, . . . , and may assume TCI #(mod(m+$N_{rep}$−1,M)) 1262 for index #$N_{rep}$ 1203, and the terminal may assume a QCL of a PDCCH DMRS, based on the TCI state determined for each of the PDCCH monitoring occasions, to perform monitoring in each of the PDCCH monitoring occasions. Mod (A,B) is a modulo calculator for outputting the remainder after A is divided by B, and the modulo calculator is operated to prevent the index of a TCI state applied to each of PDCCH occasions from exceeding a maximum index M in a configured TCI state set. Alternatively, the base station may always configure M=N number of TCI states through higher layer signaling for the terminal.

In an embodiment, the terminal may receive an MAC CE instruction of activating one or more of one or a plurality of TCI states configured in a control resource set from the base station. For example, M number of TCI states {TCI #0, TCI #1, . . . , TCI #(M−1)} may be configured for the terminal with respect to a control resource set, and the terminal may receive an MAC CE instruction of activating L number of particular TCI states {TCI #$m_1$, TCI #$m_2$, . . . , TCI #$m_L$} (0≤$m_j$<M, 1≤j≤L) among the M number of TCI states. The activated L number of TCI states may be mapped to N number of PDCCH occasions, respectively. The terminal may sequentially apply a TCI state to N number of preconfigured PDCCH monitoring occasions, starting from a first PDCCH monitoring occasion in an order that the TCI state index increase (or decrease) in a TCI state set {TCI #$m_1$, TCI #$m_2$, ..., TCI #$m_L$} activated by the MAC CE, so as to monitor a PDCCH in each of the PDCCH monitoring occasions. For example, in FIG. 12A, with respect to N (=$N_{rep}$) number of PDCCH occasions {#1(1201), #2(1202), ..., #$N_{rep}$(1203))}, if the terminal has received an instruction of activating {TCI #$m_1$, TCI #$m_2$, ..., TCI #$m_L$} by using an MAC CE, the terminal may assume TCI #$m_1$ for index #1 1201, may assume TCI #$m_2$ for index #2 1202, ..., and may assume TCI #$m_{(mod(Nrep,L))}$ for index #$N_{rep}$ 1203, and the terminal may assume a QCL of a PDCCH DMRS, based on the TCI state determined for each of the PDCCH monitoring occasions, to perform monitoring in each of the PDCCH monitoring occasions. Mod (A,B) is a modulo calculator for outputting the remainder after A is divided by B, and the modulo calculator is operated to prevent the index of a TCI state applied to each of PDCCH occasions from exceeding a maximum number L in a TCI state set activated by an MAC CE. Alternatively, the base station may always activate L=N number of TCI states through an MAC CE for the terminal.

Some embodiments among the described embodiments may be always applied to a situation in which a terminal monitors a PDCCH or may be limitedly applied to the situations as below.

A terminal monitors a PDCCH in a DRX active time.
A terminal monitors a PDCCH in a DRX inactive time.
A terminal monitors a particular search space (e.g. monitoring of a common search space or monitoring of a UE-specific search space).
A terminal monitors a particular DCI format (e.g. monitoring of scheduling DCI, monitoring of non-scheduling DCI, or monitoring of a DCI format defined for power saving (PS)).
A terminal monitors DCI scrambled by a particular RNTI (e.g. a terminal monitors DCI scrambled by an RNTI (e.g. PS-RNTI) defined for power saving, or at least one of the described RNTIs).

In an embodiment, a set of PDCCH monitoring occasions in which different beams may be applied for transmission or reception described above may correspond to a set of PDCCH monitoring occasions in which a PDCCH is repeated transmitted, described in the first embodiment and specific embodiments in the first embodiment.

(2-2)th Embodiment

With respect to a control resource set (control resource set #0) configured to have an index of 0, if the terminal has failed to receive an MAC CE activation command relating to a TCI state of control resource set #0, the terminal may assume that a DMRS transmitted in control resource set #0 is QCLed with an SS/PBCH block identified in an initial access process or a non-contention-based random access process that is not triggered by a PDCCH command.

With respect to a control resource set (control resource set #X) configured to have an index of a value rather than zero, if a TCI state relating to control resource set #X is failed to be configured for the terminal, or if one or more TCI states are configured for the terminal, but the terminal has failed to receive an MAC CE activation command of activating one of the TCI states, the terminal may assume that a DMRS transmitted in control resource set #X is QCLed with an SS/PBCH block identified in an initial access process.

The (2-2)th embodiment proposes a method for, with respect to control resource set #0 or a control resource set (named "a first control resource set") in which a TCI state is not configured and activated as described above, determining a TCT state in each PDCCH monitoring occasion of a search space monitored in a corresponding control resource set. More specifically, for example, the terminal may receive a PDCCH under the assumption of a total of M number of TCI states for N number of PDCCH monitoring occasions.

In an embodiment, if an SS/PBCH block identified to be applied to a first control resource set by a terminal is SS/PBCH #m, the terminal may assume that different QCLs are sequentially related between SS/PBCHs and N number of PDCCH monitoring occasions monitored in the first control resource set, starting from a first PDCCH monitoring occasion and SS/PBCH #m, in an order that the SS/PBCH index increases (or decreases), so as to perform PDCCH monitoring in each of the PDCCH occasions. The SS/PBCH index may correspond to the index of an SS/PBCH actually transmitted. For example, the number of SS/PBCHs actually transmitted may be a total of S, and a set of the SS/PBCHs actually transmitted may be {SS/PBCH #$m_1$, SS/PBCH #$m_2$, ..., SS/PBCH #$m_S$}. The terminal may receive, from the base station, information relating to an SS/PBCH actually transmitted through higher layer signaling (e.g. SIB or RRC). In FIG. 12A, with respect to N (=$N_{rep}$) number of PDCCH occasions {#1(1201), #2(1202), ..., #$N_{rep}$(1203))}, the terminal may assume SS/PBCH #$m_1$ for index #1 1201, may assume SS/PBCH #$m_2$ for index #2 1202, ..., and may assume SS/PBCH #m (mod$_{(Nrep,S)}$) for index #$N_{rep}$ 1203, and the terminal may assume a QCL of a PDCCH DMRS, based on the TCI state determined for each of the PDCCH occasions, to monitor a PDCCH. The modulo calculator is operated to prevent the index of an SS/PBCH applied to each of PDCCH occasions from exceeding S that is the total number of SS/PBCHs actually transmitted. Alternatively, the base station may always ensure that the terminal assumes different SS/PBCH indices in N=S number of PDCCH monitoring occasions. For example, the base station may configure, for the terminal, that with respect to the first control resource set, the number (N) (or the number $N_{rep}$ of repetitive transmissions of a PDCCH) of PDCCH monitoring occasions to which multi-beam transmission is to be applied is always the same as S that is the number of SS/PBCHs actually transmitted.

Some embodiments among the described embodiments may be always applied to a normal situation in which a terminal monitors a PDCCH or may be limitedly applied to a situation of monitoring a PDCCH as below in the first control resource set.

A terminal monitors a PDCCH in a DRX active time.
A terminal monitors a PDCCH in a DRX inactive time.
A terminal monitors a particular search space (e.g. monitoring of a common search space or monitoring of a UE-specific search space).
A terminal monitors a particular DCI format (e.g. monitoring of scheduling DCI, monitoring of non-scheduling DCI, or monitoring of a DCI format defined for power saving (PS)).
A terminal monitors DCI scrambled by a particular RNTI (e.g. a terminal monitors DCI scrambled by an RNTI (e.g. PS-RNTI) defined for power saving, or at least one of the described RNTIs).

In an embodiment, a set of PDCCH monitoring occasions in which different beams may be applied for transmission or reception described above may correspond to a set of PDCCH monitoring occasions in which a PDCCH is repeated transmitted, described in the first embodiment and specific embodiments in the first embodiment.

(2-3)th Embodiment

The (2-3)th embodiment proposes a method for determining a set of PDCCH monitoring occasions to which a multi-beam-based transmission scheme for a PDCCH is to be applied, described in the (2-1)th embodiment and the (2-2)th embodiment.

In an embodiment, a base station may configure the number (N) of PDCCH monitoring occasions, to which different TCI states are to be applied, for a terminal through higher layer signaling, L1 signaling, or a combination of higher layer signaling and L1 signaling. Alternatively, the terminal may receive configuration information indicating whether multi-beam-based transmission of a PDCCH is performed, through higher layer signaling from the base station, and the number of PDCCH monitoring occasions, to which different TCI states are to be applied, may be implicitly determined based on other system parameters (e.g. a PDCCH-related configuration, a control resource set-related configuration, a search space-related configuration, or a DRX-related configuration) configured in the terminal. A method for determining $N_{rep}$ number of PDCCH monitoring occasions in which repetitive transmission is performed, described in the first embodiment may be identically applied as a method for, after a terminal has identified N as the number of PDCCH monitoring occasions to which different TCI states are to be applied, determining the N number of PDCCH monitoring occasions to which the different TCI states have been applied.

In an embodiment, the base station and the terminal may apply the multi-beam scheme for a PDCCH to PDCCH monitoring occasions in which repetitive transmission of a PDCCH is performed. For example, the base station and the terminal may apply a multi-beam-based transmission/reception scheme described above to $N_{rep}$ number of PDCCH monitoring occasions in which a PDCCH is configured to be repeatedly transmitted. A method for determining PDCCH monitoring occasions in which repetitive transmission is performed may be identified in the first embodiment.

In an embodiment, the base station and the terminal may perform the multi-beam transmission for a PDCCH to PDCCH monitoring occasions existing in a DRX inactive time. For example, if N number of PDCCH monitoring occasions exist in a DRX inactive time, the base station and the terminal may apply a multi-beam transmission/reception scheme described above to the N number of PDCCH monitoring occasions.

In an embodiment, the base station and the terminal may perform the multi-beam transmission for a PDCCH to PDCCH monitoring occasions in which DCI scrambled by a particular RNTI is monitored. For example, the multi-beam transmission for a PDCCH may be performed with respect to PDCCH monitoring occasions configured to monitor DCI scrambled by an RNTI (e.g. PS-RNTI) defined for, for example, power saving. For example, the base station and the terminal may apply a multi-beam transmission/reception scheme described above to N number of PDCCH monitoring occasions configured to monitor DCI scrambled by a PS-RNTI.

In an embodiment, the base station may configure, for the terminal, the index of a control resource set, to which the multi-beam transmission for a PDCCH is to be applied, by using higher layer signaling or L1 signaling. The base station and the terminal may apply a multi-beam-based transmission/reception scheme for a PDCCH described above to N number of PDCCH monitoring occasions configured by all the search space sets in a control resource set configured for multi-beam transmission.

In an embodiment, the base station may configure, for the terminal, the index of a search space, to which the multi-beam transmission for a PDCCH is to be applied, by using higher layer signaling or L1 signaling. The base station and the terminal may apply a multi-beam-based transmission/reception scheme for a PDCCH described above to N number of PDCCH monitoring occasions with respect to a search space configured for multi-beam transmission.

Some embodiments among the described embodiments may be always applied to a normal situation in which a terminal monitors a PDCCH or may be limitedly applied to a situation of monitoring a PDCCH as below in the first control resource set.
- A terminal monitors a PDCCH in a DRX active time.
- A terminal monitors a PDCCH in a DRX inactive time.
- A terminal monitors a particular search space (e.g. monitoring of a common search space or monitoring of a UE-specific search space).
- A terminal monitors a particular DCI format (e.g. monitoring of scheduling DCI, monitoring of non-scheduling DCI, or monitoring of a DCI format defined for power saving (PS)).
- A terminal monitors DCI scrambled by a particular RNTI (e.g. a terminal monitors DCI scrambled by an RNTI (e.g. PS-RNTI) defined for power saving, or at least one of the described RNTIs).

(2-4)th Embodiment

A terminal may monitor a search space(s) associated with a control resource set according to a configuration of a base station in a DRX active time and a DRX inactive time. For example, the base station may configure control resource set #X for the terminal, and control resource set #X may be associated with search space #A and search space #B. In addition, search space #A may correspond to a search space which can be monitored only in a DRX active time (i.e. search space #A may be configured to monitor a DCI format scrambled by a particular RNTI which can be monitored only in a DRX active time). Search space #B may correspond to a search space which can be monitored in a DRX active time or a DRX inactive time (i.e. search space #B may be configured to monitor a DCI format scrambled by a particular RNTI (e.g. PS-RNTI) which can be monitored only in a DRX inactive time, or may be configured to monitor a DCI format scrambled by a particular RNTI (e.g. SI/P/RA-RNTI or PS-RNTI) which can be monitored always regardless of a DRX inactive or active time).

In an embodiment, the terminal may assume different TCI states for a case where control resource set #X is monitored in a DRX inactive time and a case where control resource set #X is monitored in a DRX active time. For example, the terminal may assume TCI state $\#N_1$ when control resource set #X is monitored in a DRX inactive time. The terminal may assume TCI state $\#N_2$ when control resource set #X is monitored in a DRX active time. $N_1$ and $N_2$ may correspond to an identical TCI state index, or different TCI state indices. The base station may configure, for the terminal, a set of TCI states {TCI #0, TCI #1, TCI #2, . . . , TCI #(M−1)} with respect to control resource set #X through higher layer signaling. The terminal may receive an instruction of activating TCI $\#N_1$ to be used in a DRX inactive time among TCI states configured for control resource set #X, and an instruction of activating TCI $\#N_2$ to be used in a DRX active time among the TCI states, from the base station through MAC CE signaling. Alternatively, TCI #$N_1$ to be assumed for a DRX inactive time may be implicitly determined from TCI #$N_2$ received through MAC CE signaling. The terminal may assume and receive TCI #$N_1$ in a case where the terminal monitors control resource set #X in a DRX inactive time according to an instruction of the base station, and may assume and receive TCI #$N_2$ in a case where the terminal monitors control resource set #X in a DRX active time.

Figure 12B:
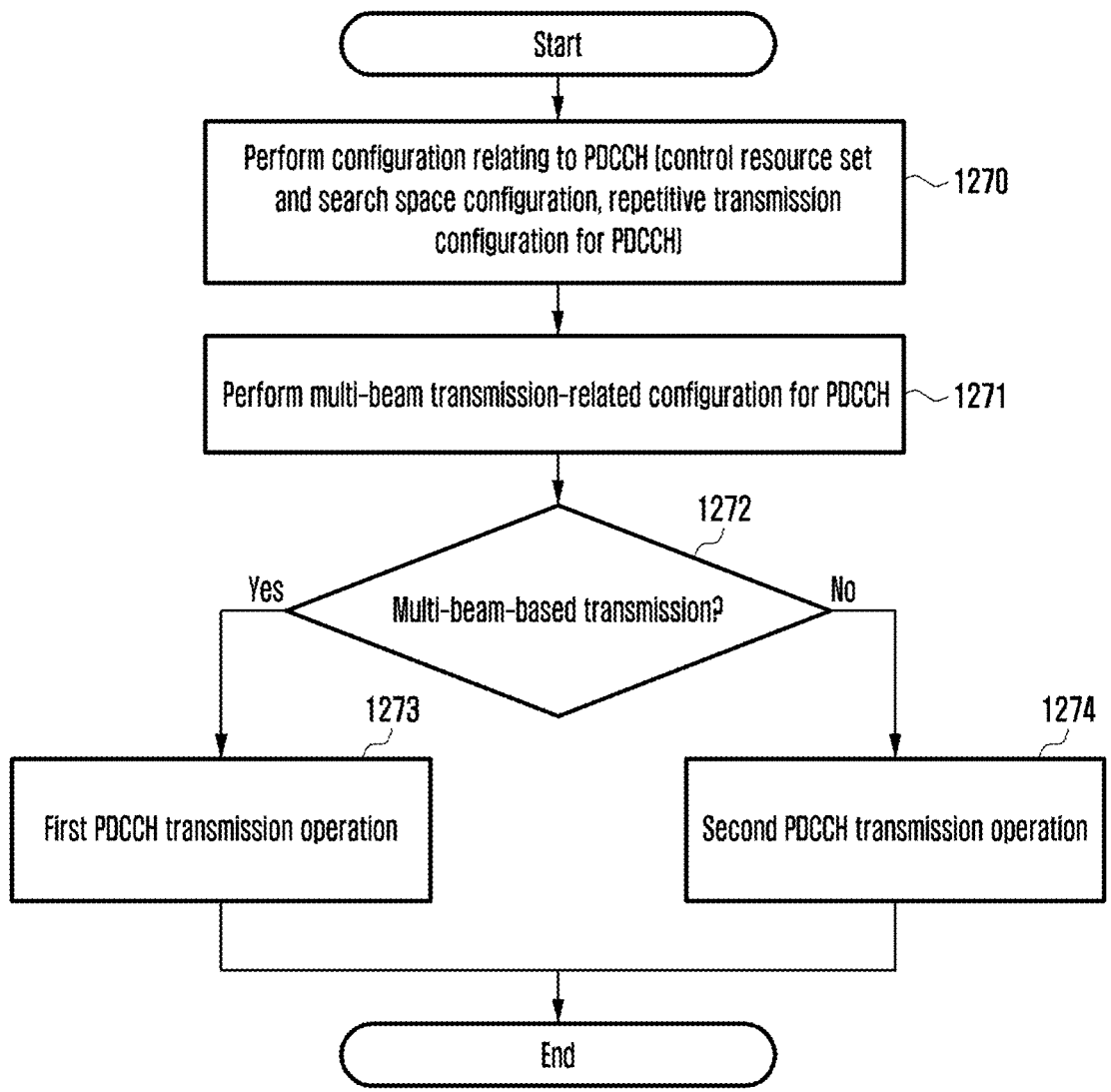
FIG. 12B illustrates a flow chart of an example of an operation of a base station according to the second embodiment.

FIG. 12B illustrates a flow chart of an example of an operation of a base station according to the second embodiment. In FIG. 12B, a base station may perform an operation of the second embodiment described with reference to FIG. 12A. In FIG. 12B, a description overlapping with the description given with reference to FIGS. 1 to 12A is omitted.

Referring to FIG. 12B, a base station may perform a configuration relating to a PDCCH (operation 1270). In an embodiment, the configuration (a first configuration) relating to a PDCCH may include a configuration (control resource set configuration) relating to a control resource set for a PDCCH, a configuration (search space configuration) relating to a search space(s) for a PDCCH, a configuration (repetitive transmission configuration) relating to repetitive transmission of a PDCCH, and or a configuration relating to DRX. The control resource set configuration relating to a PDCCH is, for example, as described with reference to FIG. 4 and Table 9, the search space configuration is, for example, as described with reference to FIG. 5 and Table 10, and the repetitive transmission configuration is as described with reference to FIG. 11A.

The base station may perform a configuration relating to whether multi-beam transmission for a PDCCH is performed (operation 1271). In an embodiment, a configuration (second configuration) relating to whether multi-beam transmission for a PDCCH is performed may include a configuration relating to whether to perform multi-beam transmission for a PDCCH or a repeatedly transmitted PDCCH, and/or relating to the number (N) of PDCCH monitoring occasions to which different TCI states are to be applied. The configuration relating to whether multi-beam transmission is performed is as described in the second embodiment with reference to FIG. 12A.

The base station may perform whether to perform multi-beam-based transmission (multi-beam transmission) for a PDCCH (operation 1272). For example, the base station may determine whether to perform multi-beam transmission for a PDCCH, based on the configuration relating to whether multi-beam transmission for a PDCCH is performed.

If multi-beam-based transmission is determined to be performed, the base station may perform a first PDCCH transmission operation (operation 1273). For example, if multi-beam-based transmission is determined to be performed, the base station may perform a multi-beam-based transmission operation for a PDCCH. The multi-beam-based transmission operation for a PDCCH of the base station is as described with reference to FIG. 12A. For example, with respect to PDCCH monitoring occasions to which multi-beam-based transmission is to be applied, the base station may assume different TCI states for the PDCCH monitoring occasions and transmit a PDCCH.

If multi-beam-based transmission is determined not to be performed, the base station may perform a second PDCCH transmission operation (operation 1274). For example, if multi-beam-based transmission is determined not to be performed, the base station may not perform a multi-beam-based transmission operation for a PDCCH as illustrated in FIG. 12A, and may perform a general (legacy) transmission operation of a PDCCH or a repetitive transmission operation of a PDCCH. For example, the base station may perform transmission under the assumption of one TCI state with respect to PDCCH monitoring occasions of a search space associated with one control resource set. The repetitive transmission operation of a PDCCH of the base station is as described with reference to FIG. 11A.

According to an embodiment, if the base station has performed a configuration relating to whether multi-beam transmission for a PDCCH is performed, the base station may directly perform a multi-beam transmission operation without performing a process of determining whether to perform multi-beam transmission in operation 1272 described above. That is, if a configuration relating to whether multi-beam transmission is performed is performed, the base station may omit a process of determining whether multi-beam-based transmission is performed, and may directly perform a multi-beam transmission operation. For example, when configuring whether multi-beam transmission is performed, the base station may perform a configuration indicating that multi-beam transmission is performed. The base station may omit operation 1272 in FIG. 12B and directly perform the first PDCCH transmission operation (multi-beam transmission operation).

Figure 12C:
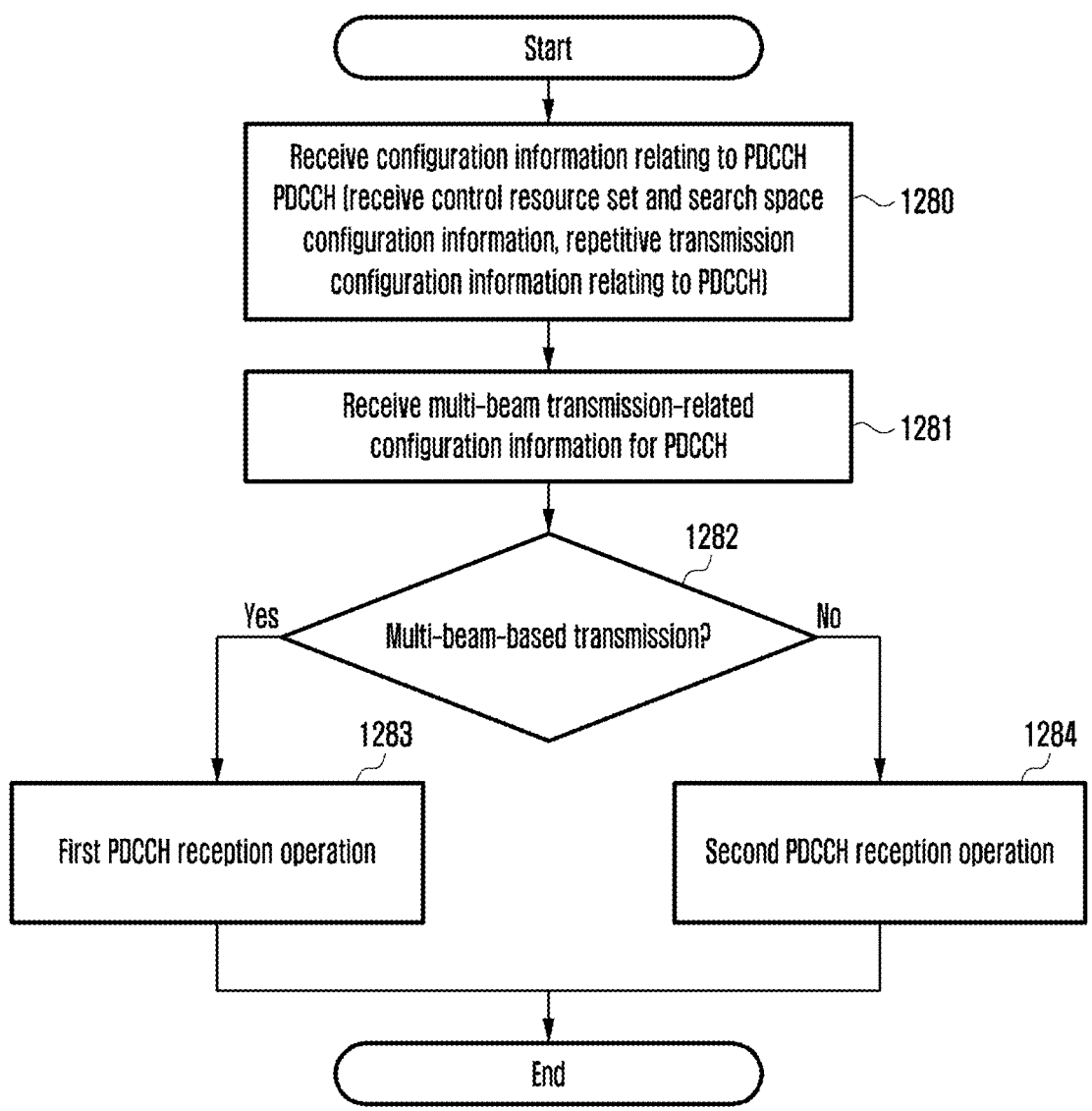
FIG. 12C illustrates a flow chart of an example of an operation of a terminal according to the second embodiment.

FIG. 12C illustrates a flow chart of an example of an operation of a terminal according to the second embodiment. In FIG. 12C, a terminal may perform an operation of the second embodiment described with reference to FIG. 12A. In FIG. 12C, a description overlapping with the description given with reference to FIGS. 1 to 12B is omitted.

Referring to FIG. 12C, a terminal may receive configuration information relating to a PDCCH from a base station (operation 1280). In an embodiment, the configuration information relating to a PDCCH may include configuration information and/or repetitive transmission configuration information relating to a PDCCH, and/or configuration information relating to DRX, described with reference to FIG. 11C. For example, configuration information relating to a PDCCH may include configuration information (control resource set configuration information) relating to a control resource set for a PDCCH, configuration information (search space configuration information) relating to a search space(s), information (repetitive transmission configuration information) relating to whether repetitive transmission of a PDCCH is performed, information (repetitive transmission number information) relating to the number of repetitive transmissions, information (repetitive transmission interval information) relating to a repetitive transmission interval, information (repetitive transmission period information) relating to a repetitive transmission period, and/or information (PDCCH monitoring occasion information) relating to a PDCCH monitoring occasion for which repetitive transmission is assumed. The pieces of information are as described with reference to FIGS. 1 to 11C.

The terminal may receive configuration information relating to multi-beam transmission for a PDCCH from the base station. The configuration information (multi-beam transmission configuration information) relating to multi-beam transmission is as described with reference to FIG. 12A. For example, multi-beam transmission configuration information may include configuration information relating to whether multi-beam transmission for a PDCCH is performed. For example, multi-beam transmission configuration information may include information indicating whether multi-beam transmission for a PDCCH has been performed, and/or configuration information relating to the number (N) of PDCCH monitoring occasions to which different TCI states are to be applied.

The terminal may determine whether multi-beam-based transmission (multi-beam transmission) for a PDCCH has been performed (operation 1282). For example, the terminal may determine whether to perform multi-beam transmission for a PDCCH, based on the received configuration information relating to whether multi-beam transmission is performed.

If it is determined that multi-beam-based transmission has been performed, the terminal may perform a first PDCCH reception operation (operation 1283). For example, if it is determined that multi-beam-based transmission has been performed, the terminal may perform a multi-beam-based reception operation for a PDCCH. For example, with respect to PDCCH monitoring occasions to which multi-beam-based transmission is applied, the terminal may assume different TCI states for the PDCCH monitoring occasions and receive a PDCCH. The multi-beam-based reception operation for a PDCCH of the terminal is as described with reference to FIG. 12A.

If it is determined that multi-beam-based transmission has not been performed, the terminal may perform a second PDCCH reception operation (operation 1284). For example, if it is determined that multi-beam-based transmission has not been performed, the terminal may not perform a multi-beam-based reception operation for a PDCCH as illustrated in FIG. 12A, and may perform a general (legacy) repetitive operation of a PDCCH or a repetitive reception operation of a PDCCH. For example, the terminal may perform reception under the assumption of one TCI state with respect to PDCCH monitoring occasions of a search space associated with one control resource set. The repetitive reception operation of a PDCCH of the terminal is as described with reference to FIG. 11A.

According to an embodiment, if the terminal has received a configuration information relating to whether multi-beam transmission is performed, the terminal may directly perform reception of multi-beam transmission without performing a process of determining whether multi-beam transmission has been performed in operation 1272 described above. That is, if configuration information relating to whether multi-beam transmission is performed is received, the terminal may omit a process of determining whether multi-beam-based transmission is performed, and may directly perform a multi-beam reception operation. For example, when configuring whether multi-beam transmission is performed, the base station may perform a configuration indicating that multi-beam transmission is performed. The terminal receiving configuration information which includes the configuration and relates to whether multi-beam transmission is performed may omit operation 1282 in FIG. 12C and directly perform the first PDCCH reception operation (multi-beam reception operation).

The detailed embodiments described above may be operated in combination.

The first embodiment and the second embodiment may be operated in combination.

Figure 13:
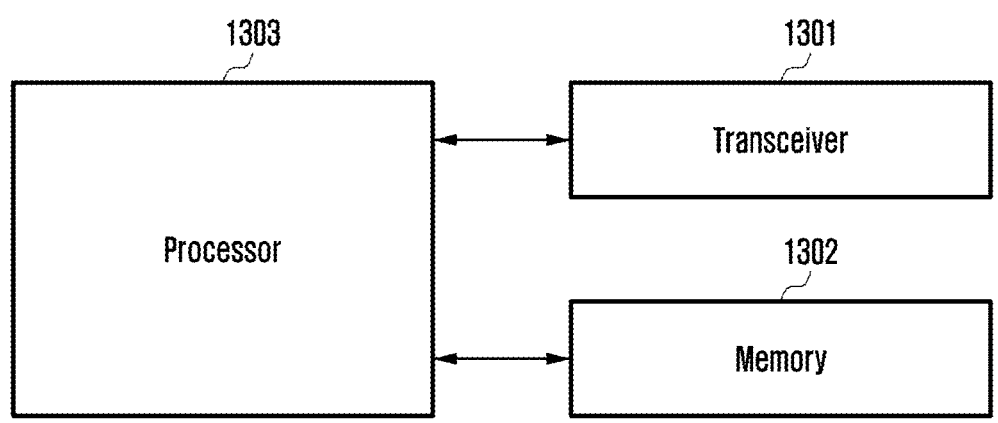
FIG. 13 illustrates a block diagram showing an internal structure of a terminal according to an embodiment.
Figure 14:
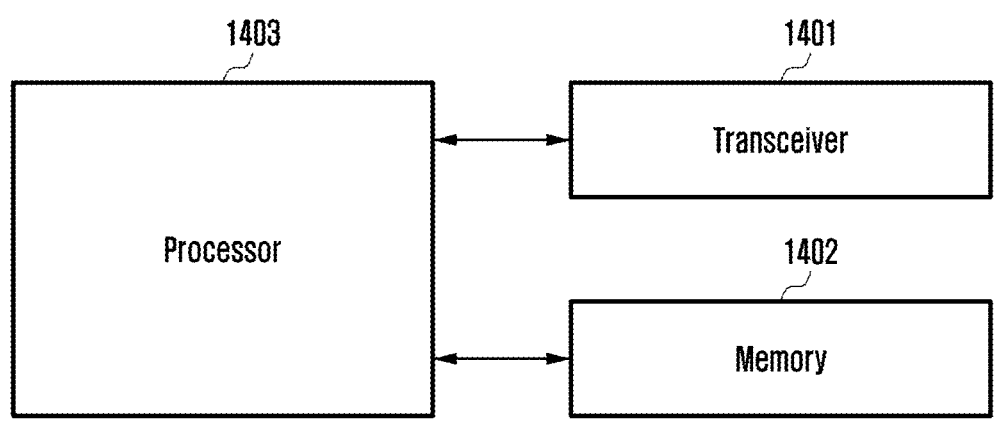
FIG. 14 illustrates a block diagram showing an internal structure of a base station according to an embodiment.

FIGS. 13 and 14 illustrate a transceiver, a memory, and a processor of a terminal and a base station to perform the embodiments described above, respectively. The embodiments described above provide a method for configuring repetitive transmission of a PDCCH, and a method for performing transmission/reception between a base station and a terminal for a multi-beam-based transmission/reception scheme for a PDCCH. In order to perform the methods, a transceiver, a memory, and a processor of a terminal and a base station are required to operate according to an embodiment.

FIG. 13 illustrates a structure of a terminal according to an embodiment.

Referring to FIG. 13, a terminal may include a transceiver 1301, a memory 1302, and a processor 1303. The elements of a terminal are not limited to the above example. For example, a terminal may include elements more or less than the above elements. In addition, the transceiver 1301, the memory 1302, and the processor 1303 may be implemented into a single chip.

According to an embodiment, the transceiver 1301 may transmit a signal to a base station, or receive a signal from the base station. The signal may include control information and data. To this end, the transceiver 1301 may include an RF transmitter that up-converts and amplifies a frequency of a transmitted signal, an RF receiver that low-noise amplifies a received signal and down-converts the frequency, and the like. In addition, the transceiver 1301 may receive a signal through a wireless channel and output the signal to the processor 1303, and may transmit a signal output from the processor 1303, through a wireless channel.

According to an embodiment, the memory 1302 may store a program and data required for an operation of the terminal. In addition, the memory 1302 may store control information or data included in a signal transmitted or received by the terminal. The memory 1302 may be configured by a storage medium such as ROM, RAM, hard disk, CD-ROM, and DVD, or a combination of storage mediums. In addition, the memory 1302 may include a plurality of memories. According to an embodiment, the memory 1302 may store a program for controlling PDCCH monitoring by the terminal and receiving the PDCCH.

According to an embodiment, the processor 1303 may control a series of processes in which the terminal may operate according to embodiments described above. For example, the processor 1303 may control monitoring of a downlink control channel according to embodiments.

Specifically, the processor 1303 may control each element of the terminal, performing the operations of: receiving configuration information relating to a PDCCH from the base station; monitoring a PDCCH from the base station, based on the configuration information relating to a PDCCH, received from the base station; and detecting the PDCCH, based on the monitoring.

In addition, the processor 1303 may include a plurality of processors, and may execute the program stored in the memory 1302 to perform a method for controlling monitoring of a downlink control channel and receiving the downlink control channel according to embodiments.

FIG. 14 illustrates a structure of a base station according to an embodiment.

Referring to FIG. 14, a base station may include a transceiver 1401, a memory 1402, and a processor 1403. However, the elements of a base station are not limited to the above example. For example, a base station may include elements more or less than the above elements. In addition, the transceiver 1401, the memory 1402, and the processor 1403 may be implemented into a single chip.

According to an embodiment, the transceiver 1401 may transmit a signal to a terminal, or receive a signal from the terminal. The signal may include control information and data. To this end, the transceiver 1401 may include an RF transmitter that up-converts and amplifies a frequency of a transmitted signal, an RF receiver that low-noise amplifies a received signal and down-converts the frequency, and the like. In addition, the transceiver 1401 may receive a signal through a wireless channel and output the signal to the processor 1403, and may transmit a signal output from the processor 1403, through a wireless channel.

According to an embodiment, the memory 1402 may store a program and data required for an operation of the base station. In addition, the memory 1402 may store control information or data included in a signal transmitted or received by the base station. The memory 3502 may be configured by a storage medium such as ROM, RAM, hard disk, CD-ROM, and DVD, or a combination of storage mediums. In addition, the memory 1402 may include a plurality of memories. According to an embodiment, the memory 1402 may store a method for controlling monitoring of a downlink control channel by a terminal and a program for generating and transmitting a downlink control channel, the method and the program being performed by the base station.

According to an embodiment, the processor 1403 may control a series of processes in which the base station may operate according to embodiments described above. For example, the processor 1403 may control each element of the base station to perform a method for controlling monitoring of a downlink control channel by a terminal and generate and transmit a downlink control channel.

In addition, the processor 1403 may include a plurality of processors, and may execute the program stored in the memory 1402 to perform a method for controlling monitoring of a downlink control channel by a terminal and a method for generating and transmitting a downlink control channel according to embodiments.

Methods disclosed in the claims and/or methods according to various embodiments described in the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

The embodiments of the disclosure described and shown in the specification and the drawings have been presented to easily explain the technical contents of the disclosure and help understanding of the disclosure, and are not intended to limit the scope of the disclosure. That is, it will be apparent to those skilled in the art that other modifications and changes may be made thereto on the basis of the technical spirit of the disclosure. Further, the above respective embodiments may be employed in combination, as necessary. For example, the embodiments of the disclosure may be partially combined to operate a base station and a terminal. Further, the embodiments of the disclosure may be applied to other communication systems, and other variants based on the technical idea of the embodiments may also be implemented. For example, the embodiments may be applied to LTE systems and 5G or NR systems.

Although the present disclosure has been described with various embodiments, various changes and modifications may be suggested to one skilled in the art. It is intended that the present disclosure encompass such changes and modifications as fall within the scope of the appended claims.

What is claimed is:

1. A method for reception of a physical downlink control channel (PDCCH), performed by a terminal in a wireless communication system, the method comprising:
receiving, from a base station, first configuration information on a PDCCH, the first configuration information including information on a control resource set and information on a search space;
obtaining a parameter which is used to configure PDCCH repetitions for a plurality of search space sets;
receiving an activation command for activating two or more transmission configuration indicator (TCI) states for the control resource set via a medium access control-control element (MAC CE) signaling;
identifying a first search space set and a second search space set to which the PDCCH repetitions are to be applied based on the parameter, wherein each of the first search space set and the second search space set comprises a plurality of PDCCH monitoring occasions on which the PDCCH is received; and
receiving, from the base station, the PDCCH repeatedly in the plurality of PDCCH monitoring occasions of the first search space set and the second search space set,
wherein quasi co-located (QCL) information based on the two or more TCI states is applied to the PDCCH in the plurality of PDCCH monitoring occasions associated with the control resource set.

2. The method of claim 1, further comprising:
receiving, from the base station, second configuration information including a number of repetitive reception, an interval of repetitive reception, and a period of repetitive reception.

3. The method of claim 1,
wherein a first PDCCH monitoring occasion corresponds to the first search space set and a second PDCCH monitoring occasion corresponds to the second search space set which is different from the first search space set, and wherein same downlink control information (DCI) is received based on the first PDCCH monitoring occasion and the second PDCCH monitoring occasion, in case that an index of the first PDCCH monitoring occasion is same as an index of the second PDCCH monitoring occasion.

4. The method of claim 1,
wherein the PDCCH in the plurality of PDCCH monitoring occasions associated with the control resource set is received on different beams, wherein each of the different beams corresponding to a PDCCH monitoring occasion is identified based on each of the two or more TCI states.

5. The method of claim 1,
wherein the control resource set is configured with an index having a value rather than 0 based on the information on the control resource set, and
wherein in case that the activation command is not received, the terminal assumes that a demodulation reference signal (DM-RS) for the PDCCH in the control resource set is quasi co-located with synchronization signals and a physical broadcast channel (SS/PBCH) block identified during an initial access procedure.

6. A terminal configured to receive a physical downlink control channel (PDCCH), in a wireless communication system, the terminal comprising:
a transceiver configured to transmit and receive a signal; and
a controller coupled with the transceiver and configured to:
receive, from a base station, first configuration information on a PDCCH, the first configuration information including information on a control resource set and information on a search space,
obtain a parameter which is used to configure PDCCH repetitions for a plurality of search space sets,
receive an activation command for activating two or more transmission configuration indicator (TCI) states for the control resource set via a medium access control-control element (MAC CE) signaling,
identify a first search space set and a second search space set to which the PDCCH repetitions are to be applied based on the parameter, wherein each of the first search space set and the second search space set comprises a plurality of PDCCH monitoring occasions on which the PDCCH is received, and
receive, from the base station, the PDCCH repeatedly in the plurality of PDCCH monitoring occasions of the first search space set and the second search space set,
wherein quasi co-located (QCL) information based on the two or more TCI states is applied to the PDCCH in the plurality of PDCCH monitoring occasions associated with the control resource set.

7. The terminal of claim 6, wherein the controller is further configured to receive, from the base station, second configuration information including a number of repetitive reception, an interval of repetitive reception, and a period of repetitive reception.

8. The terminal of claim 6,
wherein a first PDCCH monitoring occasion corresponds to the first search space set and a second PDCCH monitoring occasion corresponds to the second search space set which is different from the first search space set, and wherein same downlink control information (DCI) is received based on the first PDCCH monitoring occasion and the second PDCCH monitoring occasion, in case that an index of the first PDCCH monitoring occasion is same as an index of the second PDCCH monitoring occasion.

9. The terminal of claim 6,
wherein the PDCCH in the plurality of PDCCH monitoring occasions associated with the control resource set is received on different beams, wherein each of the different beams corresponding to a PDCCH monitoring occasion is identified based on each of the two or more TCI states.

10. A method for transmission of a physical downlink control channel (PDCCH), performed by a base station in a wireless communication system, the method comprising:
transmitting, to a terminal, first configuration information on a PDCCH, the first configuration information including information on a control resource set and information on a search space;
transmitting, to the terminal, an activation command for activating two or more transmission configuration indicator (TCI) states for the control resource set via a medium access control-control element (MAC CE) signaling;
identifying a first search space set and a second search space set to which PDCCH repetitions are to be applied based on a parameter, the parameter being used to configure the PDCCH repetitions, wherein each of the first search space set and the second search space set comprises a plurality of PDCCH monitoring occasions on which the PDCCH is transmitted; and
transmitting, to the terminal, the PDCCH repeatedly in the plurality of PDCCH monitoring occasions of the first search space set and the second search space set,
wherein quasi co-located (QCL) information based on the two or more TCI states is applied to the PDCCH in the plurality of PDCCH monitoring occasions associated with the control resource set.

11. The method of claim 10, further comprising:
transmitting, to the terminal, second configuration information including a number of repetitive transmission, an interval of repetitive transmission, and a period of repetitive transmission.

12. The method of claim 10,
wherein a first PDCCH monitoring occasion corresponds to the first search space set and a second PDCCH monitoring occasion corresponds to the second search space set which is different from the first search space set, and
wherein same downlink control information (DCI) is transmitted based on the first PDCCH monitoring occasion and the second PDCCH monitoring occasion, in case that an index of the first PDCCH monitoring occasion is same as an index of the second PDCCH monitoring occasion.

13. The method of claim 10,
wherein the PDCCH in the plurality of PDCCH monitoring occasions associated with the control resource set is transmitted on different beams, wherein each of the different beams corresponding to a PDCCH monitoring occasion is identified based on each of the two or more TCI states.

14. A base station configured to transmit a physical downlink control channel (PDCCH), in a wireless communication system, the base station comprising:

a transceiver configured to transmit and receive a signal; and a controller coupled with the transceiver and configured to:

transmit, to a terminal, first configuration information on a PDCCH, the first configuration information including information on a control resource set and information on a search space, transmit, to the terminal, an activation command for activating two or more transmission configuration indicator (TCI) states for the control resource set via a medium access control-control element (MAC CE) signaling, identify a first search space set and a second search space set to which PDCCH repetitions are to be applied based on a parameter, the parameter being used to configure the PDCCH repetitions for a plurality of search space sets, wherein each of the first search space set and the second search space set comprises a plurality of PDCCH monitoring occasions on which the PDCCH is transmitted, and transmit, to the terminal, the PDCCH repeatedly in the plurality of PDCCH monitoring occasions of the first search space set and the second search space set, wherein quasi co-located (QCL) information based on the two or more TCI states is applied to the PDCCH in the plurality of PDCCH monitoring occasions associated with the control resource set.

15. The base station of claim 14, wherein the controller is further configured to transmit, to the terminal, second configuration information including a number of repetitive transmission, an interval of repetitive transmission, and a period of repetitive transmission.

16. The base station of claim 14, wherein a first PDCCH monitoring occasion corresponds to the first search space set and a second PDCCH monitoring occasion corresponds to the second search space set which is different from the first search space set, and wherein same downlink control information (DCI) is transmitted based on the first PDCCH monitoring occasion and the second PDCCH monitoring occasion, in case that an index of the first PDCCH monitoring occasion is same as an index of the second PDCCH monitoring occasion.

17. The base station of claim 14, wherein the PDCCH in the plurality of PDCCH monitoring occasions associated with the control resource set is transmitted on different beams, wherein each of the different beams corresponding to a PDCCH monitoring occasion is identified based on each of the two or more TCI states.

\* \* \* \* \*